(12) United States Patent
Shinozaki et al.

(10) Patent No.: US 11,184,502 B2
(45) Date of Patent: Nov. 23, 2021

(54) COMMUNICATION SYSTEM, RECEPTION TERMINAL, COMMUNICATION METHOD, AND RECORDING MEDIUM

(71) Applicant: Olympus Corporation, Hachioji (JP)

(72) Inventors: Arata Shinozaki, Tokyo (JP); Yusaku Fujita, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 17/190,365

(22) Filed: Mar. 2, 2021

(65) Prior Publication Data

US 2021/0195053 A1 Jun. 24, 2021

Related U.S. Application Data

(63) Continuation of application No. PCT/JP2018/033996, filed on Sep. 13, 2018.

(51) Int. Cl.
*G06F 3/12* (2006.01)
*H04N 1/32* (2006.01)
(Continued)

(52) U.S. Cl.
CPC ............ *H04N 1/32* (2013.01); *H04N 1/32793* (2013.01); *H04N 1/333* (2013.01); *H04N 1/38* (2013.01); *H04N 1/387* (2013.01)

(58) Field of Classification Search
CPC ............ H04N 1/32; H04N 1/333; H04N 1/38; H04N 1/387; H04N 1/32793
(Continued)

(56) References Cited

U.S. PATENT DOCUMENTS 9,270,847 B2 * 2/2016 De Rosa ................. H04L 67/18
2010/0013923 A1 1/2010 Yakura
(Continued)

FOREIGN PATENT DOCUMENTS

JP A-10-150458 6/1998
JP 2001-169078 A 6/2001
(Continued)

OTHER PUBLICATIONS

PCT International Search Report to corresponding International Application No. PCT/JP2018/033996 (2 pgs.), with translation (1 pg.).

*Primary Examiner* — Gabriel I Garcia
(74) *Attorney, Agent, or Firm* — John C. Pokotylo; Pokotylo Patent Services

(57) ABSTRACT

A control circuit of a reception terminal in a communication system is configured to cause a first communicator to transmit a polling request to a first transmission terminal at a start timing of a cycle included in two or more consecutive cycles. The control circuit is configured to cause the first communicator to stop transmission of the polling request in a cycle following a transmission cycle and is configured to wait for reception of the response data in a case in which reception of the response data is not completed in the transmission cycle. The transmission cycle is a cycle in which the polling request is transmitted. The control circuit is configured to cause the first communicator to transmit the polling request to the first transmission terminal at a start timing of a cycle following another cycle in which reception of the response data is completed.

13 Claims, 26 Drawing Sheets

(51) Int. Cl.
  *H04N 1/333*    (2006.01)
  *H04N 1/327*    (2006.01)
  *H04N 1/387*    (2006.01)
  *H04N 1/38*     (2006.01)

(58) Field of Classification Search
  USPC .......................................... 358/1.1–1.18, 474
  See application file for complete search history.

(56) References Cited

U.S. PATENT DOCUMENTS

| | | | | |
|---|---|---|---|---|
| 2011/0051661 | A1* | 3/2011 | Venkob | H04L 1/1685 |
| | | | | 370/328 |
| 2015/0381919 | A1* | 12/2015 | Yamashiro | B60R 11/04 |
| | | | | 348/148 |
| 2017/0078613 | A1* | 3/2017 | Nakajima | H04N 9/8205 |

FOREIGN PATENT DOCUMENTS

| | | |
|---|---|---|
| JP | A-2004-260286 | 9/2004 |
| JP | 2006-310993 A | 11/2006 |
| JP | 2007-318411 A | 12/2007 |
| JP | 2008-219522 A | 9/2008 |
| WO | WO 2008/029658 A1 | 3/2008 |

* cited by examiner

```
{
  error: {
    error_code: "device_busy",
    error_message: "Device is too busy to handle your request."
  }
}
```

COMMUNICATION SYSTEM, RECEPTION TERMINAL, COMMUNICATION METHOD, AND RECORDING MEDIUM

The present application is a continuation application based on International Patent Application No. PCT/JP2018/033996 filed on Sep. 13, 2018, the content of which is incorporated herein by reference.

BACKGROUND OF THE INVENTION

Field of the Invention

The present invention relates to a communication system, a reception terminal, a communication method, and a recording medium.

Description of Related Art

A communication system using polling has been disclosed. The communication system includes a reception terminal and a transmission terminal. The reception terminal transmits a polling request to the transmission terminal. The transmission terminal receives the polling request and transmits response data to the reception terminal.

A technique related to polling is disclosed in Japanese Unexamined Patent Application, First Publication No. 2001-169078. A digital camera disclosed in Japanese Unexamined Patent Application, First Publication No. 2001-169078 is connected to a facsimile machine via a network. The digital camera corresponds to the transmission terminal and the facsimile machine corresponds to the reception terminal. A polling mode is set in the digital camera and the digital camera waits for an incoming call from the facsimile machine. The digital camera receives the incoming call from the facsimile machine and establishes connection to the facsimile machine. After the connection is established, the digital camera automatically presses a shutter and transmits generated data to the facsimile machine. After transmission is completed, the digital camera waits for a next incoming call from the facsimile machine.

SUMMARY OF THE INVENTION

According to a first aspect of the present invention, a communication system includes a reception terminal and a first transmission terminal. The reception terminal includes a first communicator and a first control circuit. The first communicator is configured to transmit a polling request to a first transmission terminal and receive response data from the first transmission terminal. The first transmission terminal includes a second communicator configured to receive the polling request from the reception terminal and transmit the response data to the reception terminal on the basis of the polling request. The first control circuit is configured to cause the first communicator to transmit the polling request to the first transmission terminal at a start timing of a cycle included in two or more consecutive cycles. The first control circuit is configured to cause the first communicator to receive the response data within a transmission cycle. The transmission cycle is a cycle in which the polling request is transmitted. The first control circuit is configured to cause the first communicator to stop transmission of the polling request in a cycle following the transmission cycle and is configured to wait for reception of the response data in a case in which reception of the response data is not completed in the transmission cycle. The first control circuit is configured to cause the first communicator to transmit the polling request to the first transmission terminal at a start timing of a cycle following another cycle in which reception of the response data is completed.

According to a second aspect of the present invention, in the first aspect, the first transmission terminal may further include an imaging device configured to image a subject and generate image data. The response data may be the image data. The first control circuit may be configured to cause a display to display an image on the basis of the received image data at intervals in accordance with a frame rate. The first control circuit may be configured to cause the first communicator to transmit the polling request to the first transmission terminal at a transmission timing in a case in which reception of the image data is completed in the transmission cycle. The transmission timing may be a timing at which the interval elapses from a timing at which the polling request is transmitted.

According to a third aspect of the present invention, in the second aspect, the communication system may include two or more first transmission terminals, each of which is the first transmission terminal. The first control circuit may be configured to cause the first communicator to transmit the polling request to all the two or more first transmission terminals at the start timing. The first control circuit may be configured to cause the first communicator to transmit the polling request to all the two or more first transmission terminals at the transmission timing in a case in which reception of the image data of all the two or more first transmission terminals is completed in the transmission cycle. The first control circuit may be configured to cause the first communicator to stop transmission of the polling request in the cycle following the transmission cycle and may be configured to wait for reception of the image data in a case in which reception of the image data of at least one of the two or more first transmission terminals is not completed in the transmission cycle. The first control circuit may be configured to cause the first communicator to transmit the polling request to all the two or more first transmission terminals at a start timing of a cycle following another cycle in which reception of the last image data among the image data of all the two or more first transmission terminals is completed.

According to a fourth aspect of the present invention, in the second or third aspect, the communication system may include two or more first transmission terminals, each of which is the first transmission terminal. The first control circuit may be configured to cause the display to simultaneously display two or more images at the intervals on the basis of two or more pieces of the image data received from all the two or more first transmission terminals.

According to a fifth aspect of the present invention, in the second aspect, the communication system may further include a second transmission terminal including a third communicator configured to receive the polling request from the reception terminal and transmit sensor data output from a sensor to the reception terminal as the response data. The first control circuit may be configured to cause the first communicator to transmit the polling request to the first transmission terminal and the second transmission terminal at the start timing. The first control circuit may be configured to cause the first communicator to transmit the polling request to the first transmission terminal and the second transmission terminal at the transmission timing in a case in which the image data are received from the first transmission terminal in the transmission cycle and the sensor data are received from the second transmission terminal in the transmission cycle. The first control circuit may be configured to cause the first communicator to stop transmission of the polling request in the cycle following the transmission cycle and may be configured to wait for reception of at least one of the image data and the sensor data in a case in which reception of at least one of the image data and the sensor data is not completed in the transmission cycle. The first control circuit may be configured to cause the first communicator to transmit the polling request to the first transmission terminal and the second transmission terminal at the transmission timing in a cycle following another cycle in which reception of the image data and the sensor data is completed. The first control circuit may be configured to cause the display to simultaneously display the image and the received sensor data at the intervals.

According to a sixth aspect of the present invention, in any one of the first to fifth aspects, the first control circuit may be configured to cause the first communicator to transmit the polling request to the first transmission terminal in a cycle following a waiting period in a case in which reception of the response data is not completed in the waiting period. The waiting period may include at least two consecutive cycles of the two or more consecutive cycles. The first control circuit may be configured to cause the first communicator to terminate communication with the first transmission terminal in a case in which reception of the response data is not completed in two or more of the consecutive waiting periods.

According to a seventh aspect of the present invention, in the sixth aspect, each of the first communicator and the second communicator may be configured to perform wireless communication of the polling request and the response data. The first control circuit may be configured to determine communication environment between the reception terminal and the first transmission terminal. The first control circuit may be configured to cause the first communicator to change communication channels used for communication with the first transmission terminal and resume communication with the first transmission terminal in a case in which the first communicator completes communication with the first transmission terminal and the first control circuit determines that the communication environment has deteriorated.

According to an eighth aspect of the present invention, in any one of the first to seventh aspects, the first transmission terminal may further include a second control circuit. The second control circuit may be configured to determine whether or not the response data are to be transmitted in a predetermined interval from a timing at which the polling request is received. The second control circuit may be configured to cause the second communicator to transmit instruction data to the reception terminal without transmitting the response data to the reception terminal when the second control circuit determines that the response data are not to be transmitted in the predetermined interval. The instruction data may indicate termination of communication between the reception terminal and the first transmission terminal.

According to a ninth aspect of the present invention, any one of the first to eighth aspects, the first control circuit may be configured to determine communication environment between the reception terminal and the first transmission terminal. When the first control circuit determines that the communication environment has deteriorated, the first control circuit may be configured to make each of the two or more consecutive cycles longer than each of the two or more consecutive cycles set before the communication environment deteriorates.

According to a tenth aspect of the present invention, any one of the first to ninth aspects, the first transmission terminal may further include a second control circuit and a data-compression circuit. The second control circuit may be configured to determine communication environment between the reception terminal and the first transmission terminal. The data-compression circuit may be configured to compress the response data. The second communicator may be configured to transmit the compressed response data to the reception terminal on the basis of the polling request. When the second control circuit determines that the communication environment has deteriorated, the second control circuit may be configured to make a compression rate of the response data higher than a compression rate of the response data set before the communication environment deteriorates.

According to an eleventh aspect of the present invention, a reception terminal includes a communicator and a control circuit. The communicator is configured to transmit a polling request to a transmission terminal and receive response data from the transmission terminal. The control circuit is configured to cause the communicator to transmit the polling request to the transmission terminal at a start timing of a cycle included in two or more consecutive cycles. The control circuit is configured to cause the communicator to receive the response data within a transmission cycle. The transmission cycle is a cycle in which the polling request is transmitted. The control circuit is configured to cause the communicator to stop transmission of the polling request in a cycle following a transmission cycle and is configured to wait for reception of the response data in a case in which reception of the response data is not completed in the transmission cycle. The control circuit is configured to cause the communicator to transmit the polling request to the transmission terminal at a start timing of a cycle following another cycle in which reception of the response data is completed.

According to a twelfth aspect of the present invention, a communication method includes a first step, a second step, a third step, and a fourth step. The control circuit causes the communicator to transmit a polling request to a transmission terminal at a start timing of a cycle included in two or more consecutive cycles in the first step. The control circuit causes the communicator to receive response data from the transmission terminal within a transmission cycle. The transmission cycle is a cycle in which the polling request is transmitted in the second step. The control circuit causes the communicator to stop transmission of the polling request in a cycle following a transmission cycle and waits for reception of the response data in the third step in a case in which reception of the response data is not completed in the transmission cycle. The control circuit causes the communicator to transmit the polling request to the transmission terminal at a start timing of a cycle following another cycle in which reception of the response data is completed in the fourth step.

According to a thirteenth aspect of the present invention, a non-transitory computer-readable recording medium saves a program for causing a computer to execute a first step, a second step, a third step, and a fourth step. The computer causes the communicator to transmit a polling request to a transmission terminal at a start timing of a cycle included in two or more consecutive cycles in the first step. The computer causes the communicator to receive response data from the transmission terminal within a transmission cycle. The transmission cycle is a cycle in which the polling request is transmitted in the second step. The computer causes the communicator to stop transmission of the polling request in a cycle following a transmission cycle and waits for reception of the response data in the third step in a case in which reception of the response data is not completed in the transmission cycle. The computer causes the communicator to transmit the polling request to the transmission terminal at a start timing of a cycle following another cycle in which reception of the response data is completed in the fourth step.

DETAILED DESCRIPTION OF THE INVENTION

Hereinafter, embodiments of the present invention will be described with reference to the drawings.

First Embodiment

Figure 1:
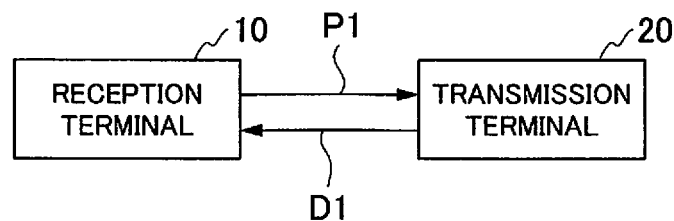
FIG. 1 is a block diagram showing a configuration of a communication system according to a first embodiment of the present invention.

FIG. 1 shows a configuration of a communication system 1 according to a first embodiment of the present invention. The communication system 1 shown in FIG. 1 includes a reception terminal 10 and a transmission terminal 20. The reception terminal 10 transmits a polling request P1 to the transmission terminal 20. The transmission terminal 20 receives the polling request P1 and transmits response data D1 to the reception terminal 10. The communication between the reception terminal 10 and the transmission terminal 20 is wired communication or wireless communication. One or more repeaters may be arranged between the reception terminal 10 and the transmission terminal 20, and the reception terminal 10 and the transmission terminal 20 may perform communication via the repeaters. At least part of the communication path between the reception terminal 10 and the transmission terminal 20 may be included in a wired or wireless network.

The communication system 1 includes an electric apparatus having a communication function. For example, the communication system 1 includes a digital video camera, a surveillance camera, an endoscope, a microscope, and the like.

Figure 2:
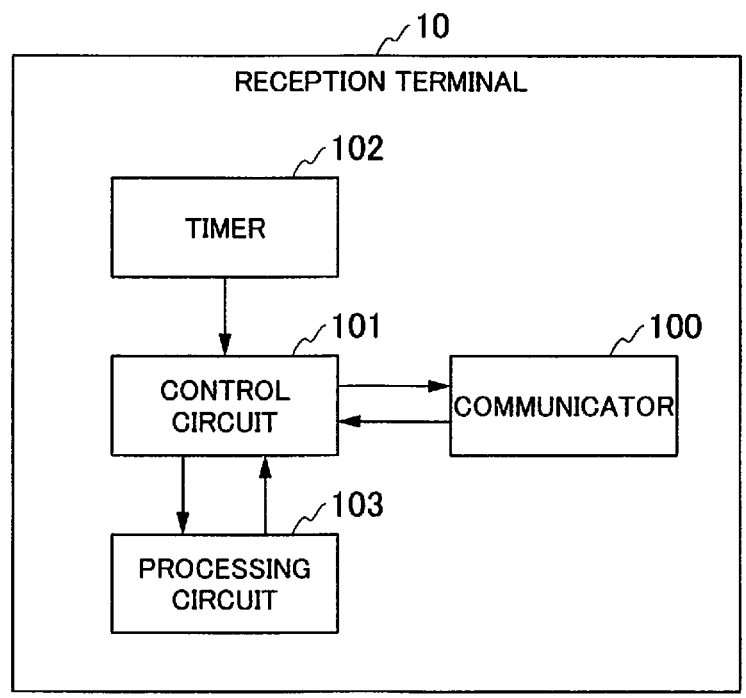
FIG. 2 is a block diagram showing a configuration of a reception terminal according to the first embodiment of the present invention.

FIG. 2 shows a configuration of the reception terminal 10. The reception terminal 10 shown in FIG. 2 includes a communicator 100 (first communicator), a control circuit 101 (first control circuit), a timer 102, and a processing circuit 103.

A schematic configuration of the reception terminal 10 will be described. The communicator 100 transmits a polling request to the transmission terminal 20 and receives response data from the transmission terminal 20. The control circuit 101 causes the communicator 100 to transmit the polling request to the transmission terminal 20 at a start timing of a cycle included in two or more consecutive cycles. For example, the lengths of the two or more cycles are the same. The control circuit 101 causes the communicator 100 to receive the response data within a transmission cycle. The transmission cycle is a cycle in which the polling request is transmitted. In a case in which reception of the response data is not completed in the transmission cycle, the control circuit 101 causes the communicator 100 to stop transmission of the polling request in a cycle following the transmission cycle and waits for reception of the response data. The control circuit 101 causes the communicator 100 to transmit the polling request to the transmission terminal 20 at a start timing of a cycle following another cycle in which reception of the response data is completed. The case in which reception of the response data is not completed in the transmission cycle includes a case in which no response data are received in the transmission cycle.

In the transmission cycle, the control circuit 101 causes the communicator 100 to stop transmission of the polling request from a timing at which the polling request is transmitted to a timing at which the transmission cycle is completed. In a case in which reception of the response data is completed in the transmission cycle, the control circuit 101 causes the communicator 100 to transmit the polling request to the transmission terminal 20 in the cycle following the transmission cycle. As long as the response data are received in the transmission cycle, the communicator 100 transmits the polling request to the transmission terminal 20 at regular intervals. In a case in which reception of the response data is not completed in the transmission cycle, the control circuit 101 causes the communicator 100 to stop transmission of the polling request in at least one cycle following the transmission cycle and waits for reception of the response data until reception of the response data is completed.

The response data may be divided into a plurality of data and a packet including each piece of data may be transmitted from the transmission terminal 20 to the reception terminal 10. In such a case, the control circuit 101 causes the communicator 100 to transmit the polling request to the transmission terminal 20 in a cycle following another cycle in which reception of all the packets corresponding to a piece of response data is completed.

A detailed configuration of the reception terminal 10 will be described. The communicator 100 is a wired or wireless communication module. The communicator 100 transmits the polling request output from the control circuit 101 to the transmission terminal 20. The communicator 100 receives the response data from the transmission terminal 20 and outputs the response data to the control circuit 101. The reception terminal 10 may include a communicator that transmits the polling request to the transmission terminal 20 and may include a communicator that receives the response data from the transmission terminal 20.

The control circuit 101 is constituted by at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). The control circuit 101 may include one or a plurality of processors. The control circuit 101 may include one or a plurality of logic circuits.

The control circuit 101 outputs the polling request to the communicator 100 at a timing that is based on a timing signal output from the timer 102. The control circuit 101 receives the response data output from the communicator 100 and outputs the response data to the processing circuit 103. The control circuit 101 recognizes a start timing and an end timing of each of the two or more cycles on the basis of the timing signal.

The control circuit 101 may read a program and execute the read program. The program includes commands defining the operations of the control circuit 101. In other words, the functions of the control circuit 101 may be realized by software. The program, for example, may be provided by using a "computer-readable storage medium" such as a flash memory. The program may be transmitted from a computer storing the program to the reception terminal 10 through a transmission medium or by using carrier waves in a transmission medium. The "transmission medium" transmitting a program is a medium that has a function of transmitting information. The medium that has the function of transmitting information includes a network (communication network) such as the Internet and a communication circuit line (communication line) such as a telephone circuit line. The program described above may realize at least some of the functions described above. Furthermore, the program described above may be a differential file (differential program). The combination of a program that has already been recorded in a computer and a differential program may realize the functions described above.

The control circuit 101 transmits the polling request to the transmission terminal 20 by using the communicator 100. Specifically, the control circuit 101 controls the communicator 100 such that the polling request is transmitted to the transmission terminal 20. In other words, the control circuit 101 causes the communicator 100 to transmit the polling request for the transmission terminal 20. In this way, the communicator 100 transmits the polling request to the transmission terminal 20. The control circuit 101 receives the response data from the transmission terminal 20 by using the communicator 100. Specifically, the control circuit 101 controls the communicator 100 such that the response data are received from the transmission terminal 20. In other words, the control circuit 101 causes the communicator 100 to receive the response data transmitted from the transmission terminal 20. In this way, the communicator 100 receives the response data from the transmission terminal 20.

The timer 102 periodically generates the timing signal at predetermined intervals. The timer 102 outputs the generated timing signal to the control circuit 101. For example, the intervals at which the timer 102 generates the timing signal are set so as to be the same as the length of the cycle in which the processing circuit 103 processes the response data. The control circuit 101 sets the intervals at which the timing signal is generated such that the polling request is transmitted to the transmission terminal 20 in synchronization with the processing executed by the processing circuit 103.

The processing circuit 103 is constituted by at least one of a processor and a logic circuit. The processing circuit 103 may include one or a plurality of processors. The processing circuit 103 may include one or a plurality of logic circuits. The processing circuit 103 processes the response data output from the control circuit 101 for display or storage. For example, in a case in which the response data are compressed, the processing circuit 103 expands the response data.

The timer 102 is not essential to the reception terminal 10. For example, an external apparatus outside the reception terminal 10 may include the timer 102 and the timing signal generated by the timer 102 may be input from the apparatus to the reception terminal 10. The processing circuit 103 is not essential to the reception terminal 10. For example, an external apparatus outside the reception terminal 10 may include the processing circuit 103 and the response data may be output from the reception terminal 10 to the apparatus.

Figure 3:
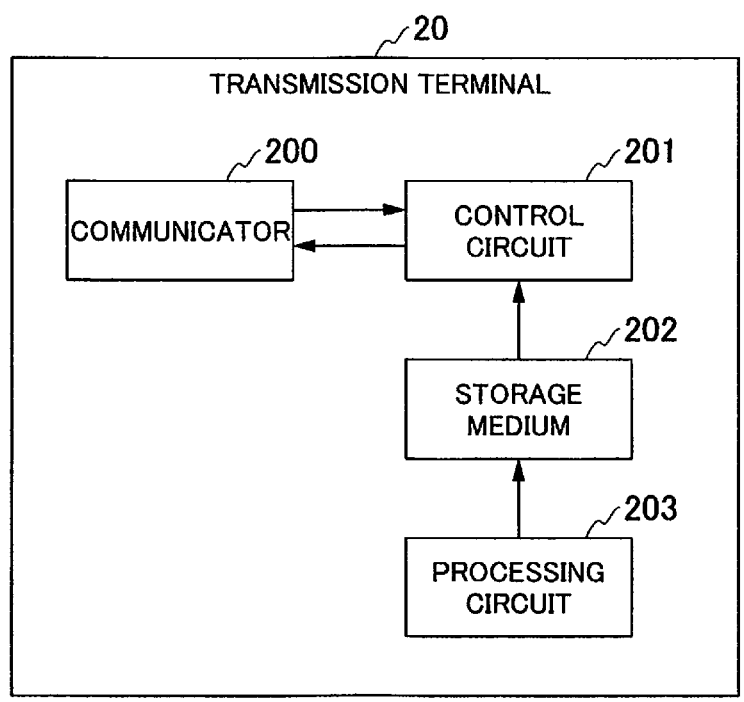
FIG. 3 is a block diagram showing a configuration of a transmission terminal according to the first embodiment of the present invention.

FIG. 3 shows a configuration of the transmission terminal 20 (first transmission terminal). The transmission terminal 20 shown in FIG. 3 includes a communicator 200 (second communicator), a control circuit 201 (second control circuit), a storage medium 202, and a processing circuit 203.

The communicator 200 is a wired or wireless communication module. The communicator 200 receives the polling request from the reception terminal 10 and transmits the response data to the reception terminal 10 on the basis of the polling request. The communicator 200 outputs the polling request received from the reception terminal 10 to the control circuit 201. The communicator 200 transmits the response data output from the control circuit 201 to the reception terminal 10. The transmission terminal 20 may include a communicator that receives the polling request from the reception terminal 10 and may include a communicator that transmits the response data to the reception terminal 10.

The control circuit 201 is constituted by at least one of a processor and a logic circuit. The control circuit 201 may include one or a plurality of processors. The control circuit 201 may include one or a plurality of logic circuits.

The control circuit 201 reads the response data from the storage medium 202 on the basis of the polling request output from the communicator 200. The control circuit 201 outputs the response data to the communicator 200.

The control circuit 201 may read a program including commands defining the operations of the control circuit 201 and may execute the read program. In other words, the functions of the control circuit 201 may be realized by software. The implementation form of this program is similar to that of the program realizing the functions of the control circuit 101 shown in FIG. 2.

The control circuit 201 receives the polling request from the reception terminal 10 by using the communicator 200. Specifically, the control circuit 201 controls the communicator 200 such that the polling request is received from the reception terminal 10. In other words, the control circuit 201 causes the communicator 200 to receive the polling request transmitted from the reception terminal 10. In this way, the communicator 200 receives the polling request from the reception terminal 10. The control circuit 201 transmits the response data to the reception terminal 10 by using the communicator 200. Specifically, the control circuit 201 controls the communicator 200 such that the response data are transmitted to the reception terminal 10. In other words, the control circuit 201 causes the communicator 200 to transmit the response data for the reception terminal 10. In this way, the communicator 200 transmits the response data to the reception terminal 10.

The storage medium 202 is a volatile or nonvolatile memory. For example, the storage medium 202 is a random-access memory (RAM), a dynamic random-access memory (DRAM), a static random-access memory (SRAM), or a flash memory. The storage medium 202 stores the response data output from the processing circuit 203.

The processing circuit 203 is constituted by at least one of a processor and a logic circuit. The processing circuit 203 may include one or a plurality of processors. The processing circuit 203 may include one or a plurality of logic circuits. For example, the processing circuit 203 is connected to a data generation circuit and the response data generated by the data generation circuit is input to the processing circuit 203. The communicator 200 may receive the response data transmitted from an apparatus including the data generation circuit and may output the response data to the processing circuit 203. The processing circuit 203 processes the response data and outputs the processed response data to the storage medium 202. For example, the processing circuit 203 compresses the response data. The response data are periodically generated at predetermined intervals and the processing circuit 203 processes the response data at predetermined intervals.

The storage medium 202 and the processing circuit 203 are not essential to the transmission terminal 20. For example, an apparatus outside the transmission terminal 20 may include the storage medium 202 and the processing circuit 203.

Figure 4:
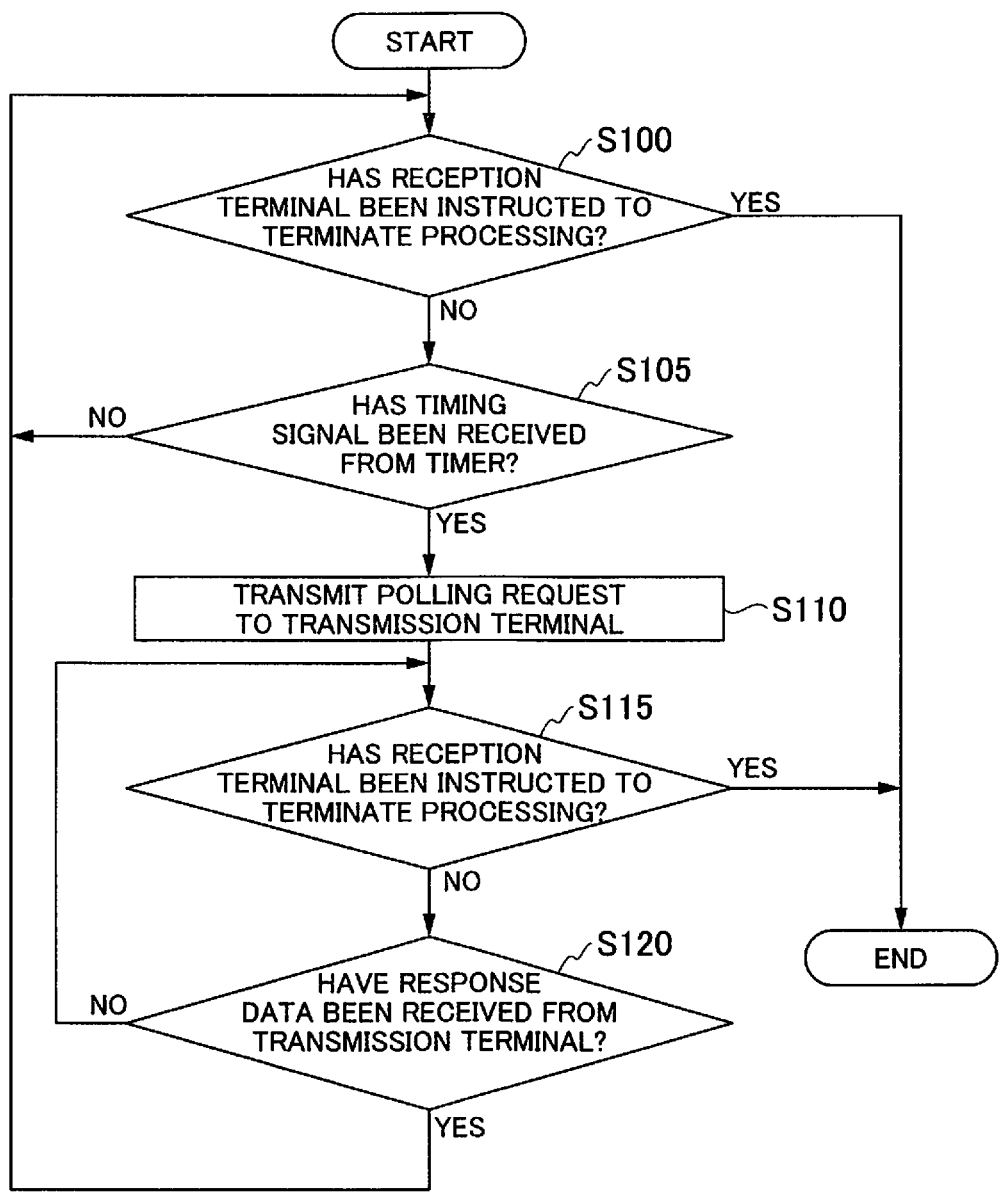
FIG. 4 is a flow chart showing a procedure of processing executed by the reception terminal according to the first embodiment of the present invention.

FIG. 4 shows a procedure of processing executed by the reception terminal 10. An operation of the reception terminal 10 will be described with reference to FIG. 4.

The control circuit 101 determines whether or not the reception terminal 10 has been instructed to terminate processing. For example, the control circuit 101 determines whether or not the terminal has been instructed to shut down the terminal or complete (disconnect) communication by a user. When the terminal has been instructed to shut down the terminal or complete communication by a user, the control circuit 101 determines that the reception terminal 10 has been instructed to terminate processing. When the terminal has been instructed to neither shut down the terminal nor complete communication by a user, the control circuit 101 determines that the reception terminal 10 has not been instructed to terminate processing. The communicator 100 may receive instruction data indicating an instruction for completing communication from the transmission terminal 20. In a case in which the instruction data have been received, the control circuit 101 may determine that the reception terminal 10 has been instructed to terminate processing. In a case in which the instruction data have not been received, the control circuit 101 may determine that the reception terminal 10 has not been instructed to terminate processing (Step S100).

When the control circuit 101 determines that the reception terminal 10 has been instructed to terminate processing in Step S100, the processing shown in FIG. 4 is completed. When the control circuit 101 determines that the reception terminal 10 has not been instructed to terminate processing in Step S100, the control circuit 101 determines whether or not the timing signal has been received from the timer 102 (Step S105).

When the control circuit 101 determines that the timing signal has not been received from the timer 102 in Step S105, the processing in Step S100 is executed. When the control circuit 101 determines that the timing signal has been received from the timer 102 in Step S105, the control circuit 101 causes the communicator 100 to transmit the polling request to the transmission terminal 20. In this way, the communicator 100 transmits the polling request to the transmission terminal 20 (Step S110).

After Step S110, the control circuit 101 determines whether or not the reception terminal 10 has been instructed to terminate processing (Step S115). The processing in Step S115 is similar to that in Step S100.

When the control circuit 101 determines that the reception terminal 10 has been instructed to terminate processing in Step S115, the processing shown in FIG. 4 is completed. When the control circuit 101 determines that the reception terminal 10 has not been instructed to terminate processing in Step S115, the control circuit 101 monitors the communicator 100 and determines whether or not the response data have been received from the transmission terminal 20. In a case in which the response data have been transmitted from the transmission terminal 20, the control circuit 101 causes the communicator 100 to receive the response data from the transmission terminal 20 (Step S120).

When the control circuit 101 determines that the response data have not been received from the transmission terminal 20 in Step S120, the processing in Step S115 is executed. The control circuit 101 waits for reception of the response data by executing the processing in each of Step S115 and Step S120 until the response data are received from the transmission terminal 20.

When the control circuit 101 determines that the response data have been received from the transmission terminal 20 in Step S120, the processing in Step S100 is executed. In such a case, the control circuit 101 outputs the response data to the processing circuit 103 and the processing circuit 103 processes the response data in a step not shown in FIG. 4. Step S100 and Step S115 are not essential.

Figure 5:
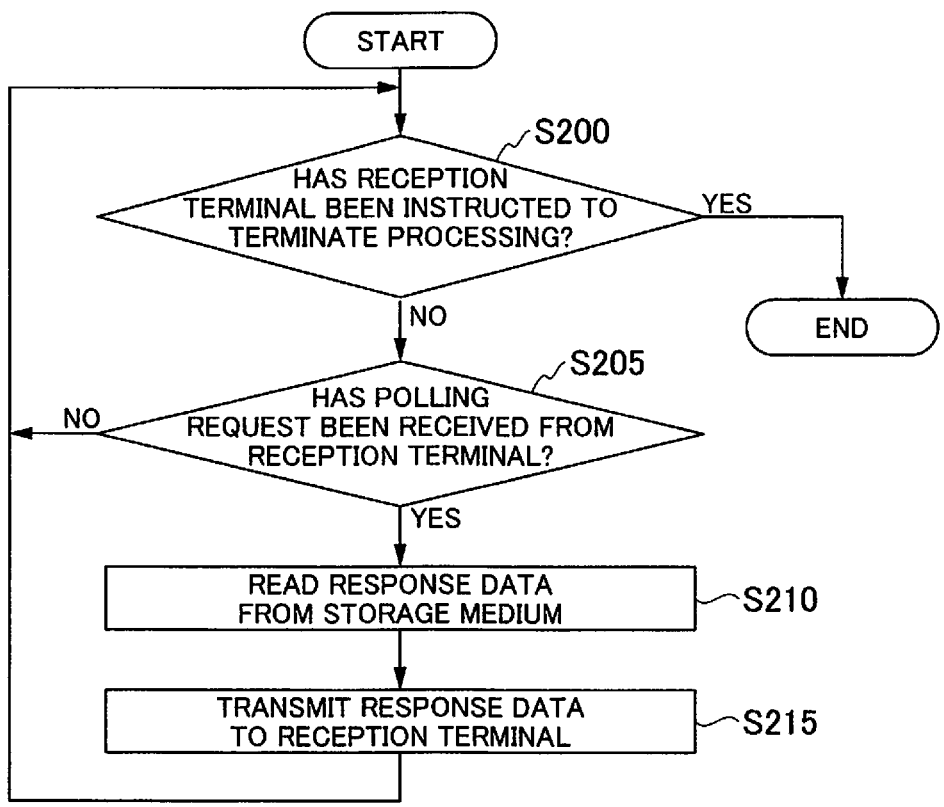
FIG. 5 is a flow chart showing a procedure of processing executed by the transmission terminal according to the first embodiment of the present invention.

FIG. 5 shows a procedure of processing executed by the transmission terminal 20. An operation of the transmission terminal 20 will be described with reference to FIG. 5.

The control circuit 201 determines whether or not the transmission terminal 20 has been instructed to terminate processing (Step S200). The processing in Step S200 is similar to that in Step S100 or Step S115 shown in FIG. 4.

When the control circuit 201 determines that the transmission terminal 20 has been instructed to terminate processing in Step S200, the processing shown in FIG. 5 is completed. When the control circuit 201 determines that the transmission terminal 20 has not been instructed to terminate processing in Step S200, the control circuit 201 monitors the communicator 200 and determines whether or not the polling request has been received from the reception terminal 10. In a case in which the polling request has been transmitted from the reception terminal 10, the control circuit 201 causes the communicator 200 to receive the polling request from the reception terminal 10 (Step S205).

When the control circuit 201 determines that the polling request has not been received from the reception terminal 10 in Step S205, the processing in Step S200 is executed. When the control circuit 201 determines that the polling request has been received from the reception terminal 10 in Step S205, the control circuit 201 reads the response data from the storage medium 202 (Step S210).

The control circuit 201 confirms that transmissible response data are stored on the storage medium 202 in Step S210. The transmissible response data are the response data that have not been transmitted to the reception terminal 10 yet. In a case in which the transmissible response data are stored on the storage medium 202, the control circuit 201 reads the response data from the storage medium 202 in Step S210. In a case in which a multiple pieces of response data are stored on the storage medium 202, the response data are read from the storage medium 202 in the order in which the response data are generated. After the response data are read from the storage medium 202, the control circuit 201 may delete the response data from the storage medium 202. In a case in which the transmissible response data are not stored on the storage medium 202, the control circuit 201 waits until the transmissible response data are stored on the storage medium 202. In other words, in a case in which the processing circuit 203 has not completed the processing of the response data, the control circuit 201 waits for completion of the processing.

After Step S210, the control circuit 201 causes the communicator 200 to transmit the response data to the reception terminal 10. In this way, the communicator 200 transmits the response data to the reception terminal 10 (Step S215). After Step S215, the processing in Step S200 is executed. Step S200 is not essential.

A communication method according to each aspect of the present invention includes first to fourth steps. The control circuit 101 causes the communicator 100 to transmit the polling request to the transmission terminal 20 at a start timing of each of at least one of two or more consecutive cycles (first step). The first step corresponds to Step S110. The control circuit 101 causes the communicator 100 to receive the response data within a transmission cycle (second step). The transmission cycle is a cycle in which the polling request is transmitted. The second step corresponds to Step S120. In a case in which reception of the response data of the transmission terminal 20 is not completed in a transmission cycle, the control circuit 101 causes the communicator 100 to stop transmission of the polling request in a cycle following the transmission cycle and waits for reception of the response data (third step). The third step corresponds to Step S120. The control circuit 101 causes the communicator 100 to transmit the polling request to the transmission terminal 20 at a start timing of a cycle following another cycle in which reception of the response data is completed (fourth step). The fourth step corresponds to Step S110.

Figure 6:
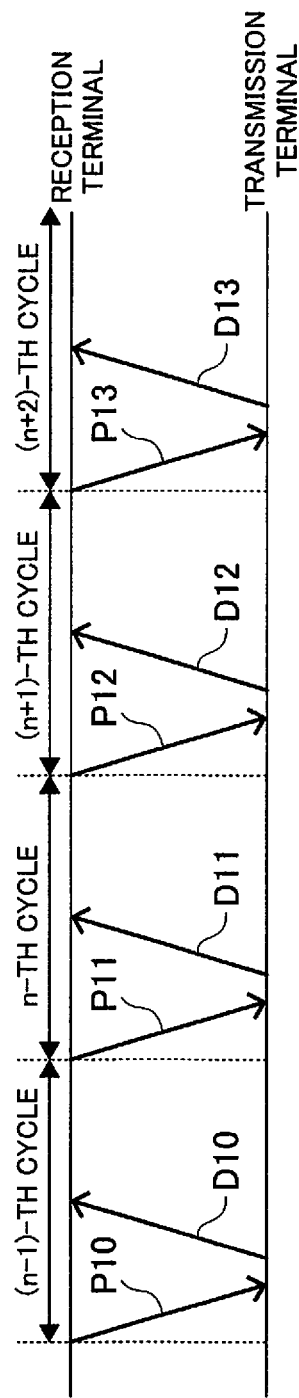
FIG. 6 is a timing chart showing communication performed by the reception terminal and the transmission terminal according to the first embodiment of the present invention.
Figure 7:
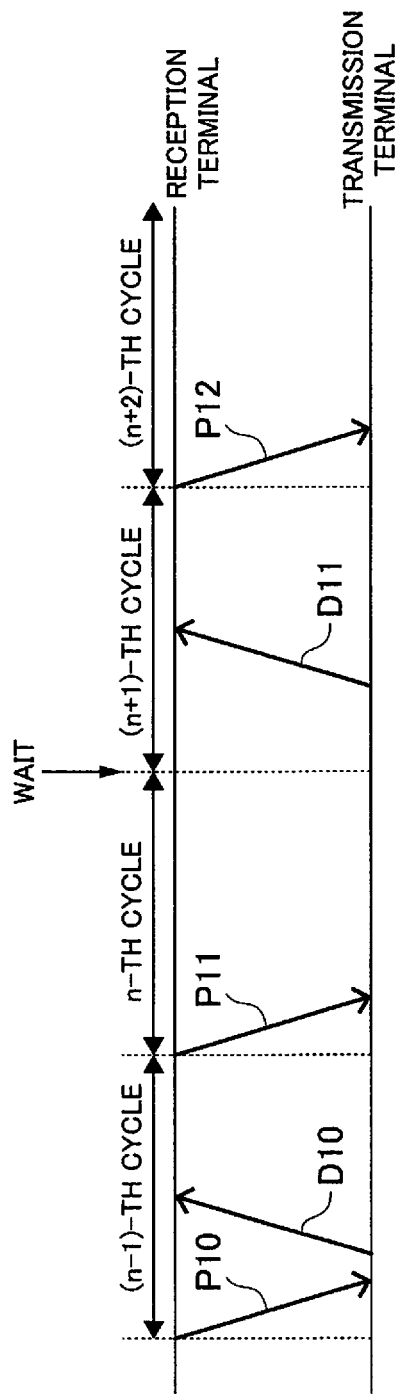
FIG. 7 is a timing chart showing communication performed by the reception terminal and the transmission terminal according to the first embodiment of the present invention.
Figure 8:
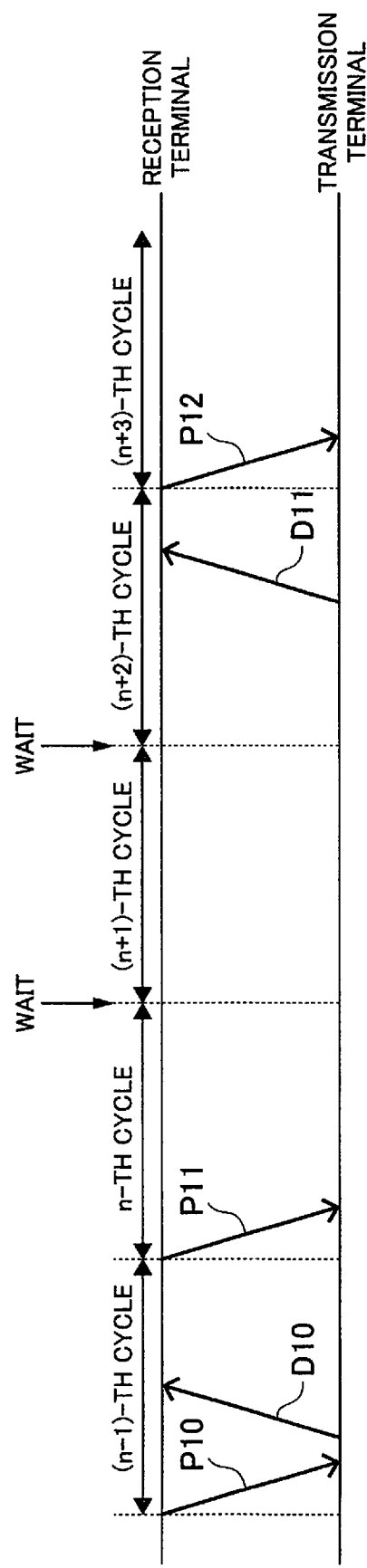
FIG. 8 is a timing chart showing communication performed by the reception terminal and the transmission terminal according to the first embodiment of the present invention.

FIGS. 6 to 8 show timings of communication of the polling request and the response data in multiple cycles in a row. The number n showing a number of each cycle is an integer. For example, the length of each cycle is 100 ms.

FIG. 6 shows communication in a case in which the response data are always received in the same cycle as that in which the polling request is transmitted. When the timing signal is output from the timer 102, the (n−1)-th cycle is started. At this time, the reception terminal 10 transmits a polling request P10 to the transmission terminal 20 (Step S110).

The transmission terminal 20 receives the polling request P10 (Step S205). When transmissible response data are stored on the storage medium 202, the transmission terminal 20 transmits response data D10 to the reception terminal 10 (Step S215).

In the (n−1)-th cycle, the reception terminal 10 receives the response data D10 (Step S120). After the response data D10 are received, the control circuit 101 waits for the timing signal output from the timer 102 in the (n−1)-th cycle.

When the timing signal is output from the timer 102, the n-th cycle is started. At this time, the reception terminal 10 transmits a polling request P11 to the transmission terminal 20 (Step S110).

The transmission terminal 20 receives the polling request P11 (Step S205). When transmissible response data are stored on the storage medium 202, the transmission terminal 20 transmits response data D11 to the reception terminal 10 (Step S215).

In the n-th cycle, the reception terminal 10 receives the response data D11 (Step S120). After the response data D11 are received, the control circuit 101 waits for the timing signal output from the timer 102 in the n-th cycle.

When the timing signal is output from the timer 102, the (n+1)-th cycle is started. At this time, the reception terminal 10 transmits a polling request P12 to the transmission terminal 20 (Step S110). Thereafter, a similar operation to that described above is repeated. The transmission terminal 20 receives the polling request P12 and transmits response data D12 to the reception terminal 10 (Step S205 and Step S215). In the (n+1)-th cycle, the reception terminal 10 receives the response data D12 (Step S120).

When the (n+2)-th cycle is started, the reception terminal 10 transmits a polling request P13 to the transmission terminal 20 (Step S110). The transmission terminal 20 receives the polling request P13 and transmits response data D13 to the reception terminal 10 (Step S205 and Step S215). In the (n+2)-th cycle, the reception terminal 10 receives the response data D13 (Step S120).

For example, the amount of data is different between pieces of the response data. Therefore, the processing load of the processing circuit 203 is different between pieces of the response data, and a timing at which each piece of response data are stored on the storage medium 202 in each cycle is different between pieces of the response data. The processing load of the processing circuit 103 is also different between pieces of the response data. In order to make descriptions simple, the processing load of the processing circuit 103 is assumed to be fixed.

Even if the response data are received in the same cycle as that (transmission cycle) in which the polling request is transmitted, the reception terminal 10 does not immediately transmit a next polling request. The reception terminal 10 stops transmission of the polling request in the transmission cycle. In the next cycle to the cycle in which reception of the response data is completed, the reception terminal 10 transmits the polling request to the transmission terminal 20. In other words, in the next cycle to the transmission cycle, the reception terminal 10 transmits the polling request to the transmission terminal 20.

FIG. 7 shows communication in a case in which the response data are not received in the same cycle as that in which the polling request is transmitted. Communication in the (n−1)-th cycle is the same as that in the (n−1)-th cycle shown in FIG. 6.

When the timing signal is output from the timer 102, the n-th cycle is started. At this time, the reception terminal 10 transmits a polling request P11 to the transmission terminal 20 (Step S110).

The transmission terminal 20 receives the polling request P11 (Step S205). The control circuit 201 waits until transmissible response data are stored on the storage medium 202 (Step S210). The processing circuit 203 is unable to complete the processing of the response data in the n-th cycle.

In the n-th cycle, the control circuit 101 waits for reception of the response data (Step S120). The timing signal is output from the timer 102 and the (n+1)-th cycle is started while the control circuit 101 waits for reception of the response data. In the (n+1)-th cycle, the control circuit 101 continues to wait for reception of the response data (Step S120).

In the (n+1)-th cycle, when transmissible response data are stored on the storage medium 202, the transmission terminal 20 transmits response data D11 to the reception terminal 10 (Step S215). In the (n+1)-th cycle, the reception terminal 10 receives the response data D11 (Step S120). After the response data D11 are received, the control circuit 101 waits for the timing signal output from the timer 102 in the (n+1)-th cycle.

When the timing signal is output from the timer 102, the (n+2)-th cycle is started. At this time, the reception terminal 10 transmits a polling request P12 to the transmission terminal 20 (Step S110).

In the (n−1)-th cycle in which the polling request P10 is transmitted, the reception terminal 10 receives the response data D10 from the transmission terminal 20. In the n-th cycle next to the (n−1)-th cycle, the reception terminal 10 transmits the polling request P11 to the transmission terminal 20. In the (n+1)-th cycle next to the n-th cycle in which the polling request P11 is transmitted, the reception terminal 10 receives the response data D11 from the transmission terminal 20. In the (n+2)-th cycle next to the (n+1)-th cycle, the reception terminal 10 transmits the polling request P12 to the transmission terminal 20.

FIG. 8 shows communication in a case in which the response data are not received in the same cycle as that in which the polling request is transmitted. The processing time of certain response data in the transmission terminal 20 is different between FIG. 7 and FIG. 8. Communication in the (n−1)-th cycle is the same as that in the (n−1)-th cycle shown in FIG. 6 and FIG. 7. Communication in the n-th cycle is the same as that in the n-th cycle shown in FIG. 7.

The processing circuit 203 is unable to complete the processing of the response data in the n-th cycle. Furthermore, the processing circuit 203 is unable to complete the processing of the response data in the (n+1)-th cycle.

In the (n+1)-th cycle, the control circuit 101 waits for reception of the response data (Step S120). The timing signal is output from the timer 102 and the (n+2)-th cycle is started while the control circuit 101 waits for reception of the response data. In the (n+2)-th cycle, the control circuit 101 continues to wait for reception of the response data (Step S120).

In the (n+2)-th cycle, when transmissible response data are stored on the storage medium 202, the transmission terminal 20 transmits response data D11 to the reception terminal 10 (Step S215). In the (n+2)-th cycle, the reception terminal 10 receives the response data D11 (Step S120). After the response data D11 are received, the control circuit 101 waits for the timing signal output from the timer 102 in the (n+2)-th cycle.

When the timing signal is output from the timer 102, the (n+3)-th cycle is started. At this time, the reception terminal 10 transmits a polling request P12 to the transmission terminal 20 (Step S110).

In the (n−1)-th cycle in which the polling request P10 is transmitted, the reception terminal 10 receives the response data D10 from the transmission terminal 20. In the n-th cycle next to the (n−1)-th cycle, the reception terminal 10 transmits the polling request P11 to the transmission terminal 20. In the (n+2)-th cycle that is two cycles after the n-th cycle in which the polling request P11 is transmitted, the reception terminal 10 receives the response data D11 from the transmission terminal 20. In the (n+3)-th cycle next to the (n+2)-th cycle, the reception terminal 10 transmits the polling request P12 to the transmission terminal 20.

In the above-described example, in a case in which the processing load of the processing circuit 203 of the transmission terminal 20 is large, reception of the response data is delayed in the reception terminal 10. The reason why reception of the response data is delayed is not limited to the processing load of the processing circuit 203 of the transmission terminal 20. There is a possibility that reception of the response data is delayed when the throughput of routers on the network is reduced. In addition, there is a possibility that reception of the response data is delayed when the number (hop number) of routers on the selected path on the network increases and the delays of communication are accumulated. When the congestion in the network occurs or S/N of signals deteriorates due to occurrence of noise, loss of packets occurs. There is a possibility that reception of the response data is delayed when loss of packets occurs.

The control circuit 101 according to the first embodiment causes the communicator 100 to transmit the polling request to the transmission terminal 20 in a cycle following another cycle in which reception of the response data is completed. This operation is independent of whether or not the response data are received in the same cycle as that (transmission cycle) in which the polling request is transmitted. Therefore, control of transmitting the polling request can be simplified. In a case in which the response data are received in the same cycle as the transmission cycle, the reception terminal 10 can periodically acquire the response data.

In a case in which reception of the response data is not completed in a transmission cycle, the control circuit 101 causes the communicator 100 to stop transmission of the polling request in the cycle following the transmission cycle. Therefore, the reception terminal 10 can restrict unnecessary transmission of the polling request.

It is assumed that the reception terminal 10 transmits the polling request in order to display the response data at regular intervals or output the response data as a log at regular intervals. In a case in which each of the intervals at which the response data are output is much longer than each of the intervals at which the response data are received, buffering of a great deal of data is necessary in the reception terminal 10. For example, in a case in which n pieces of response data are received every n cycles and one piece of response data is output from the reception terminal 10 every cycle, buffering of n pieces of response data is necessary. The number n is two or more.

As long as the response data are received in the same cycle as that in which the polling request is transmitted, the reception terminal 10 transmits the polling request to the transmission terminal 20 at the same intervals as those at which the response data are output. Therefore, the capacity for buffering of data can be minimized in the reception terminal 10.

Second Embodiment

Figure 9:
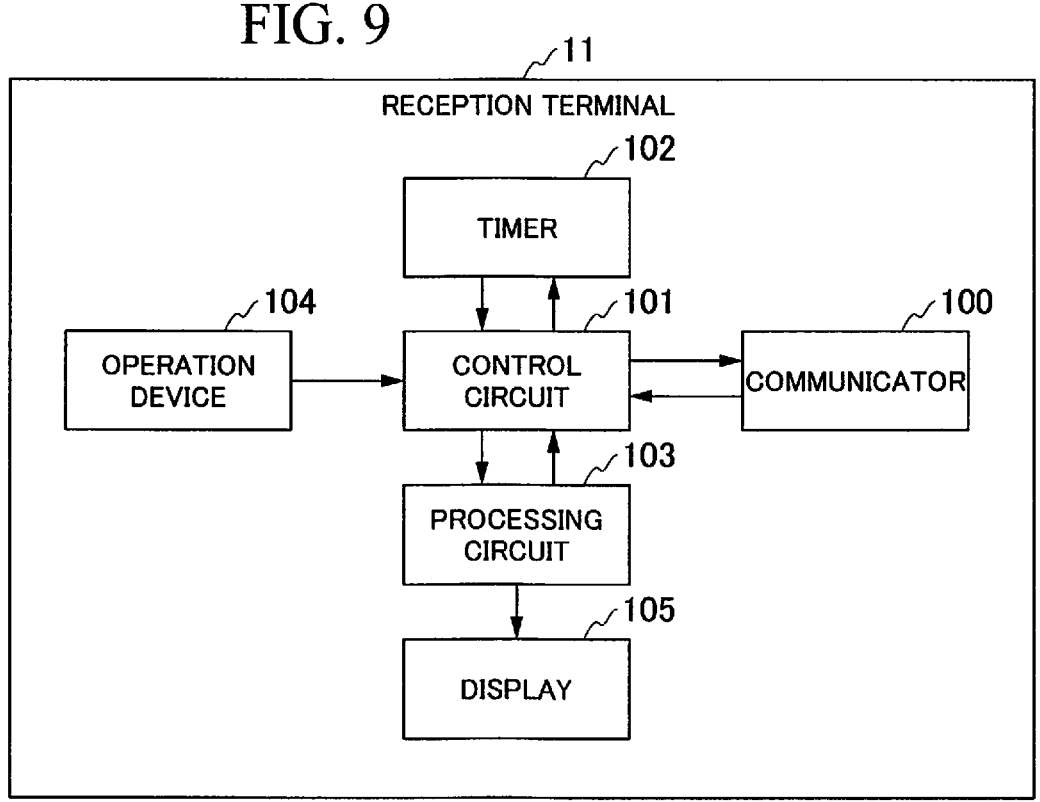
FIG. 9 is a block diagram showing a configuration of a reception terminal according to a second embodiment of the present invention.
Figure 10:
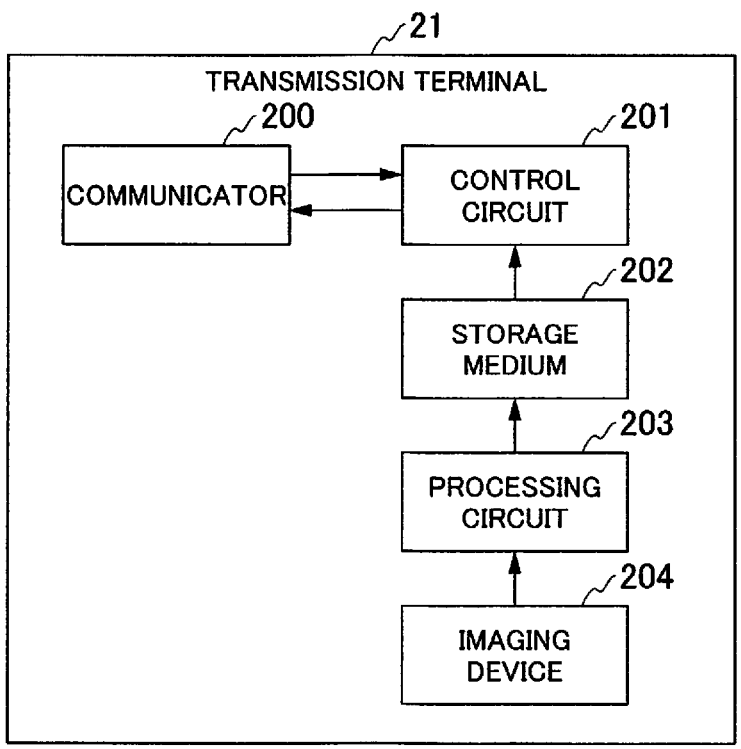
FIG. 10 is a block diagram showing a configuration of a transmission terminal according to the second embodiment of the present invention.

In a second embodiment of the present invention, the reception terminal 10 shown in FIG. 2 is changed to a reception terminal 11 shown in FIG. 9 and the transmission terminal 20 shown in FIG. 3 is changed to a transmission terminal 21 shown in FIG. 10. FIG. 9 shows a configuration of the reception terminal 11. The same configuration as that shown in FIG. 2 will not be described.

The reception terminal 11 includes an operation device 104 and a display 105 in addition to the configuration shown in FIG. 2. Image data are transmitted from the transmission terminal 21 as the response data. The communicator 100 receives the image data from the transmission terminal 21 and outputs the image data to the control circuit 101. The control circuit 101 outputs the received image data to the processing circuit 103. The processing circuit 103 processes the image data and outputs the image data to the display 105. The control circuit 101 outputs the image data to the display 105 via the processing circuit 103. The control circuit 101 causes the display 105 to display an image on the basis of the received image data at intervals in accordance with a frame rate. In a case in which reception of the image data is completed in a cycle in which the polling request is transmitted, the control circuit 101 causes the communicator 100 to transmit the polling request to the transmission terminal 21 at a transmission timing. The transmission timing is a timing at which an interval in accordance with the frame rate elapses from a timing at which the polling request is transmitted. The transmission timing is included in the next cycle to the cycle in which the polling request is transmitted.

The operation device 104 is a user interface. For example, the operation device 104 includes at least one of a button, a switch, a key, a mouse, a joystick, a touch pad, a track ball, and a touch panel. A user can designate a frame rate by operating the operation device 104. The operation device 104 accepts the frame rate designated by a user and outputs information of the frame rate to the control circuit 101.

For example, the display 105 (monitor) is a liquid crystal display or an organic electroluminescence (EL) display. The operation device 104 and the display 105 may be configured as a touch panel. The display 105 displays an image at intervals in accordance with the frame rate on the basis of the image data output from the processing circuit 103. In other words, the display 105 displays a moving image at intervals in accordance with the frame rate.

The frame rate for display in the reception terminal 11 indicates the number of frames of the image to be displayed in a second. The reciprocal number of the frame rate indicates the length of a cycle.

The operation device 104 is not essential to the reception terminal 11. For example, the operation device 104 may be arranged outside the reception terminal 11 and information of the frame rate may be input from the operation device 104 to the reception terminal 11. The display 105 is not essential to the reception terminal 11. For example, the display 105 may be arranged outside the reception terminal 11 and the image data may be output from the reception terminal 11 to the display 105.

FIG. 10 shows a configuration of the transmission terminal 21. The same configuration as that shown in FIG. 3 will not be described.

The transmission terminal 21 includes an imaging device 204 in addition to the configuration shown in FIG. 3. The imaging device 204 is an image sensor. The imaging device 204 images a subject and generates image data. The imaging device 204 generates the image data at intervals in accordance with a frame rate. The frame rate for imaging in the transmission terminal 21 indicates the number of frames of an image generated in a second. For example, the frame rate for imaging in the transmission terminal 21 is the same as the frame rate for display in the reception terminal 11. The frame rate for imaging may be different from the frame rate for display. The imaging device 204 outputs the generated image data to the processing circuit 203.

The processing circuit 203 processes the image data at intervals in accordance with the frame rate. The processing circuit 203 outputs the processed image data to the storage medium 202. Since the processing load of the processing circuit 203 is different between pieces of the image data, the intervals at which the processing circuit 203 outputs the image data to the storage medium 202 are not necessarily fixed. The storage medium 202 stores the image data output from the processing circuit 203.

The control circuit 201 reads the image data from the storage medium 202 on the basis of the polling request output from the communicator 200. The control circuit 201 outputs the image data to the communicator 200. The communicator 200 transmits the image data output from the control circuit 201 to the reception terminal 11 as the response data.

Figure 11:
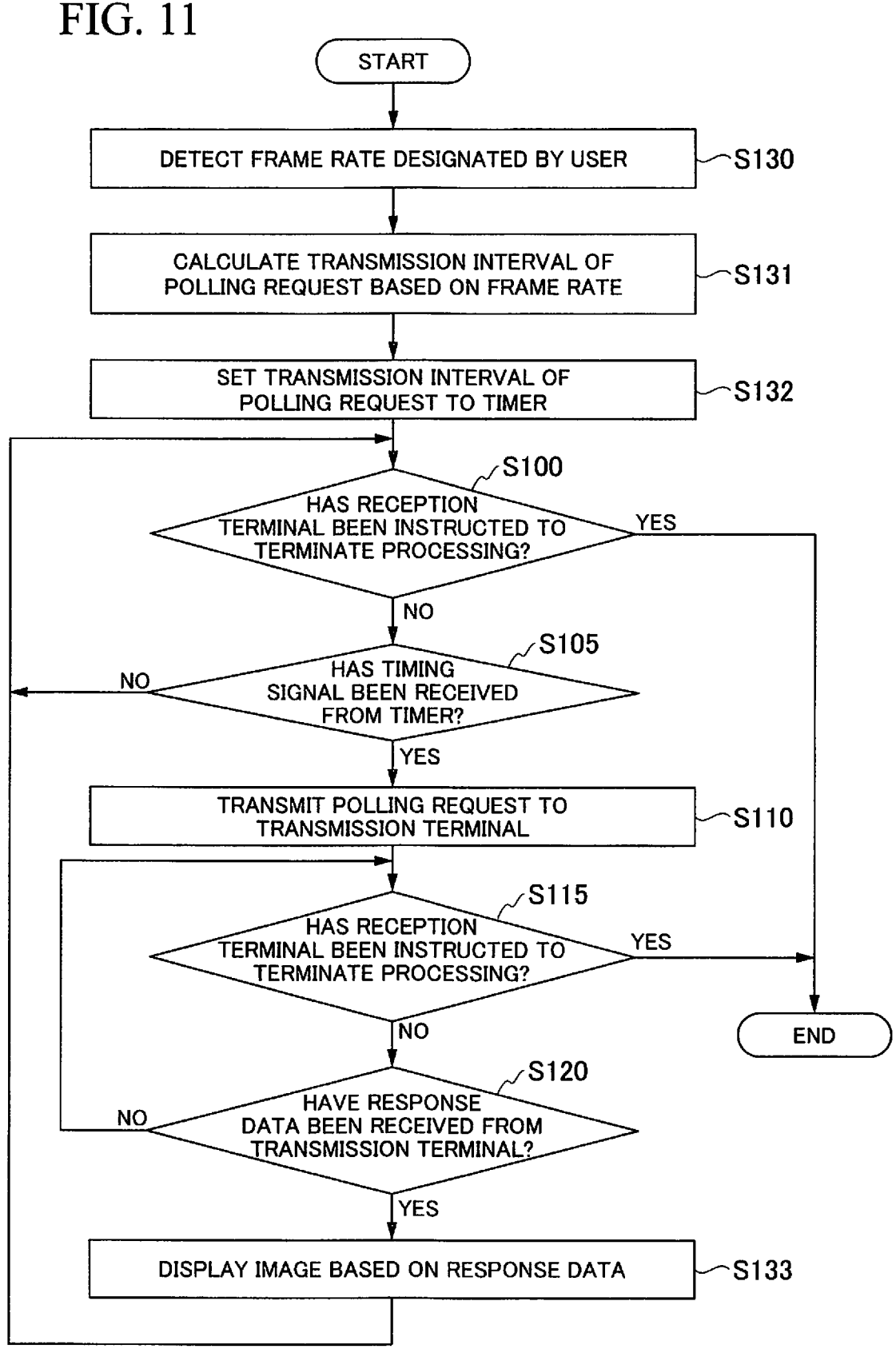
FIG. 11 is a flow chart showing a procedure of processing executed by the reception terminal according to the second embodiment of the present invention.

The reception terminal 11 executes processing shown in FIG. 11 instead of the processing shown in FIG. 4. FIG. 11 shows a procedure of the processing executed by the reception terminal 11. An operation of the reception terminal 11 will be described with reference to FIG. 11. The same processing as that shown in FIG. 4 will not be described.

A user designates a frame rate by operating the operation device 104. The operation device 104 outputs information of the frame rate designated by the user to the control circuit 101. The control circuit 101 detects the frame rate designated by the user on the basis of the information output from the operation device 104 (Step S130).

After Step S130, the control circuit 101 calculates a transmission interval of the polling request on the basis of the frame rate (Step S131). The transmission interval of the polling request is the reciprocal number of the frame rate.

After Step S131, the control circuit 101 sets the calculated transmission interval to the timer 102 (Step S132). The timer 102 outputs the timing signal at the set transmission intervals. After Step S132, the processing in Step S100 is executed.

When the control circuit 101 determines that the response data, i.e., the image data have been received from the transmission terminal 21 in Step S120, the control circuit 101 outputs the received image data to the processing circuit 103. The processing circuit 103 processes the image data and outputs the image data to the display 105. The display 105 displays an image on the basis of the image data (Step S133). After Step S133, the processing in Step S100 is executed.

As long as the image data are received in a cycle (transmission cycle) in which the polling request is transmitted, the display 105 displays an image at intervals in accordance with the frame rate. In a case in which reception of the image data is not completed in the transmission cycle, the control circuit 101 may cause the display 105 to display an image again on the basis of the previously received image data. In a case in which reception of the image data is not completed in two or more consecutive cycles, the display 105 repeatedly displays an image on the basis of the same image data.

Steps S130 to S132 are not essential. Accordingly, the transmission interval of the polling request may be fixed.

Figure 12:
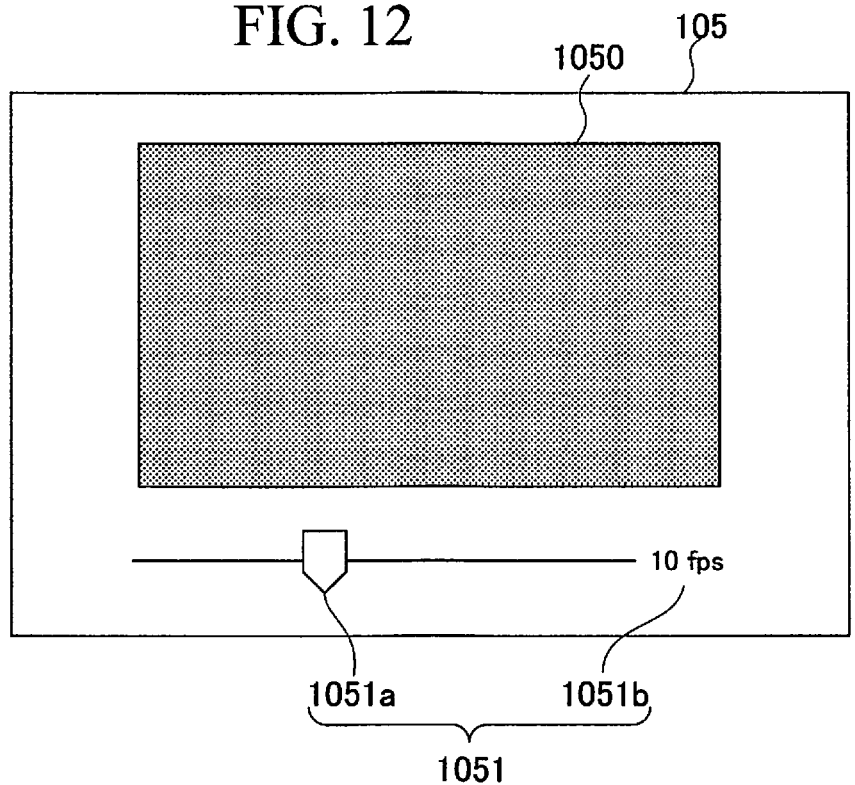
FIG. 12 is a diagram showing a screen of a display according to the second embodiment of the present invention.

FIG. 12 shows a screen of the display 105. The display 105 displays an image 1050 and frame-rate information 1051. The image 1050 is displayed on the basis of the image data received from the transmission terminal 21. The frame-rate information 1051 includes an instruction unit 1051*a* and a value 1051*b*. In a case in which the display 105 is a touch panel, a user designates a frame rate by operating the instruction unit 1051*a*. The value 1051*b* indicates the frame rate designated by the user. The screen of the display 105 is not limited to the example shown in FIG. 12.

The transmission terminal 21 executes the processing shown in FIG. 5. Since an operation of the transmission terminal 21 is similar to that of the transmission terminal 20 according to the first embodiment, details of the operation will not be described.

In the second embodiment, in a case in which the image data are received in the same cycle as that in which the polling request is transmitted, the reception terminal 11 can periodically acquire the image data.

Third Embodiment

Figure 13:
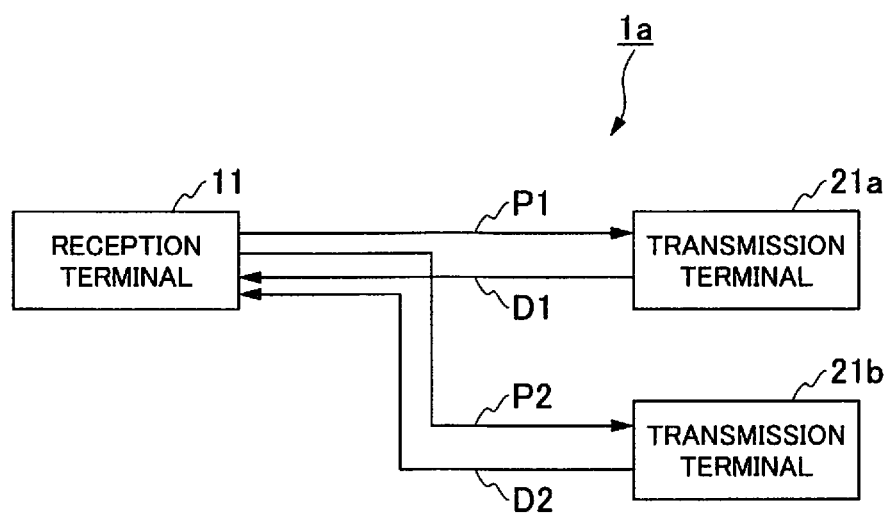
FIG. 13 is a block diagram showing a configuration of a communication system according to a third embodiment of the present invention.

FIG. 13 shows a configuration of a communication system 1*a* according to a third embodiment of the present invention. The communication system 1*a* shown in FIG. 13 includes a reception terminal 11, a transmission terminal 21*a*, and a transmission terminal 21*b*. The configuration of the reception terminal 11 is the same as that shown in FIG. 9. The configuration of each of the transmission terminal 21*a* and the transmission terminal 21*b* is the same as that shown in FIG. 10.

The reception terminal 11 transmits a polling request P1 to the transmission terminal 21*a* and transmits a polling request P2 to the transmission terminal 21*b*. The transmission terminal 21*a* receives the polling request P1 and transmits response data D1 to the reception terminal 11. The transmission terminal 21*b* receives the polling request P2 and transmits response data D2 to the reception terminal 11. The reception terminal 11 may include a communicator that performs communication with the transmission terminal 21*a* and may include a communicator that performs communication with the transmission terminal 21*b*.

The communication system 1*a* has only to include two or more transmission terminals. In the example shown in FIG. 13, the communication system 1*a* includes two transmission terminals. The communication system 1*a* may include three or more transmission terminals. The control circuit 101 of the reception terminal 11 causes the communicator 100 to transmit the polling requests to all the two or more transmission terminals in at least one of two or more consecutive cycles. In a case in which reception of image data of all the two or more transmission terminals is completed in a transmission cycle, the control circuit 101 causes the communicator 100 to transmit the polling requests to all the two or more transmission terminals at a transmission timing. The transmission cycle is a cycle in which the polling requests are transmitted. The transmission timing is a timing at which an interval in accordance with a frame rate elapses from a timing at which the polling requests are transmitted. The transmission timing is included in the next cycle to the cycle in which the polling requests are transmitted. In a case in which reception of image data of at least one of the two or more transmission terminals is not completed in the transmission cycle, the control circuit 101 causes the communicator 100 to stop transmission of the polling requests in a cycle following the transmission cycle and waits for reception of the image data. The control circuit 101 causes the communicator 100 to transmit the polling requests to all the two or more transmission terminals in a cycle following another cycle in which reception of the last image data among the image data of all the two or more transmission terminals is completed. The last image data are image data received last among all pieces of the image data received from all the two or more transmission terminals in a transmission cycle.

The control circuit 101 causes the display 105 to simultaneously display two or more images on the basis of two or more pieces of the image data received from all the two or more transmission terminals at intervals in accordance with the frame rate. The reception terminal 11 may include two or more displays. The two or more displays may simultaneously display different images.

Figure 14:
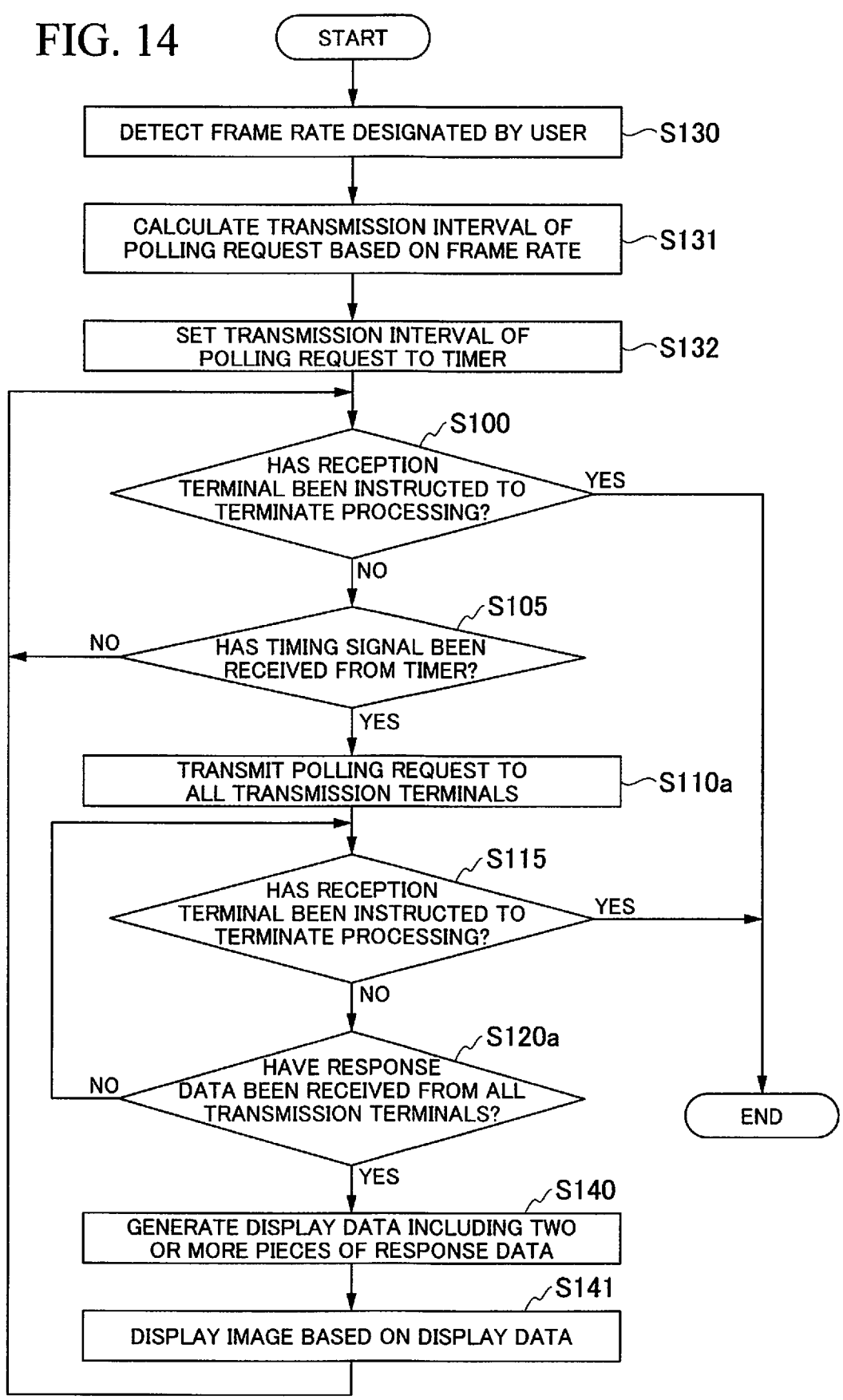
FIG. 14 is a flow chart showing a procedure of processing executed by a reception terminal according to the third embodiment of the present invention.

The reception terminal 11 executes processing shown in FIG. 14 instead of the processing shown in FIG. 11. FIG. 14 shows a procedure of the processing executed by the reception terminal 11. An operation of the reception terminal 11 will be described with reference to FIG. 14. The same processing as that shown in FIG. 11 will not be described.

When the control circuit 101 determines that the timing signal is received from the timer 102 in Step S105, the control circuit 101 causes the communicator 100 to transmit the polling requests to the transmission terminal 21a and the transmission terminal 21b. In this way, the communicator 100 transmits the polling requests to the transmission terminal 21a and the transmission terminal 21b (Step S110a). After Step S110a, the processing in Step S115 is executed.

The control circuit 101 causes the communicator 100 to simultaneously transmit the polling requests to the transmission terminal 21a and the transmission terminal 21b in Step S110a. In a case in which each transmission terminal is able to transmit the response data (image data) in the cycle in which the polling requests are transmitted, the reception terminal 11 needs to receive the response data from each transmission terminal in the cycle. As long as such a condition is met, the control circuit 101 may cause the communicator 100 to sequentially transmit the polling requests to the transmission terminal 21a and the transmission terminal 21b.

When the control circuit 101 determines that the reception terminal 11 has not been instructed to terminate processing in Step S115, the control circuit 101 monitors the communicator 100 and determines whether or not the image data have been received from the transmission terminal 21a and the transmission terminal 21b. In a case in which the image data have been transmitted from the transmission terminal 21a and the transmission terminal 21b, the control circuit 101 causes the communicator 100 to receive the image data from the transmission terminal 21a and the transmission terminal 21b (Step S120a).

When the control circuit 101 determines that the response data have not been received from at least one of the transmission terminal 21a and the transmission terminal 21b in Step S120a, the processing in Step S115 is executed. The control circuit 101 waits for reception of the response data by executing the processing in each of Step S115 and Step S120a until the response data are received from both the transmission terminal 21a and the transmission terminal 21b.

When the control circuit 101 determines that the response data have been received from the transmission terminal 21a and the transmission terminal 21b in Step S120a, the control circuit 101 outputs two pieces of the response data received from the two transmission terminals to the processing circuit 103. In other words, the control circuit 101 outputs two pieces of image data to the processing circuit 103. The processing circuit 103 processes the two pieces of image data and generates display data including the two pieces of image data (Step S140). For example, the processing circuit 103 generates the display data for displaying two images in a state in which the two images are arranged in the horizontal or vertical direction in Step S140.

After Step S140, the processing circuit 103 outputs the generated display data to the display 105. The display 105 simultaneously displays two images on the basis of the display data output from the processing circuit 103 (Step S141). The control circuit 101 causes the display 105 to simultaneously display the two images on the basis of the two pieces of image data received from the transmission terminal 21a and the transmission terminal 21b in Step S141. After Step S141, the processing in Step S100 is executed.

As long as the image data are received from each of the transmission terminal 21a and the transmission terminal 21b in a cycle in which the polling request is transmitted, the display 105 simultaneously displays the two images at intervals in accordance with the frame rate.

The transmission terminal 21a and the transmission terminal 21b execute the processing shown in FIG. 5. Since an operation of each of the transmission terminal 21a and the transmission terminal 21b is similar to that of the transmission terminal 20 according to the first embodiment, details of the operation will not be described.

Figure 15:
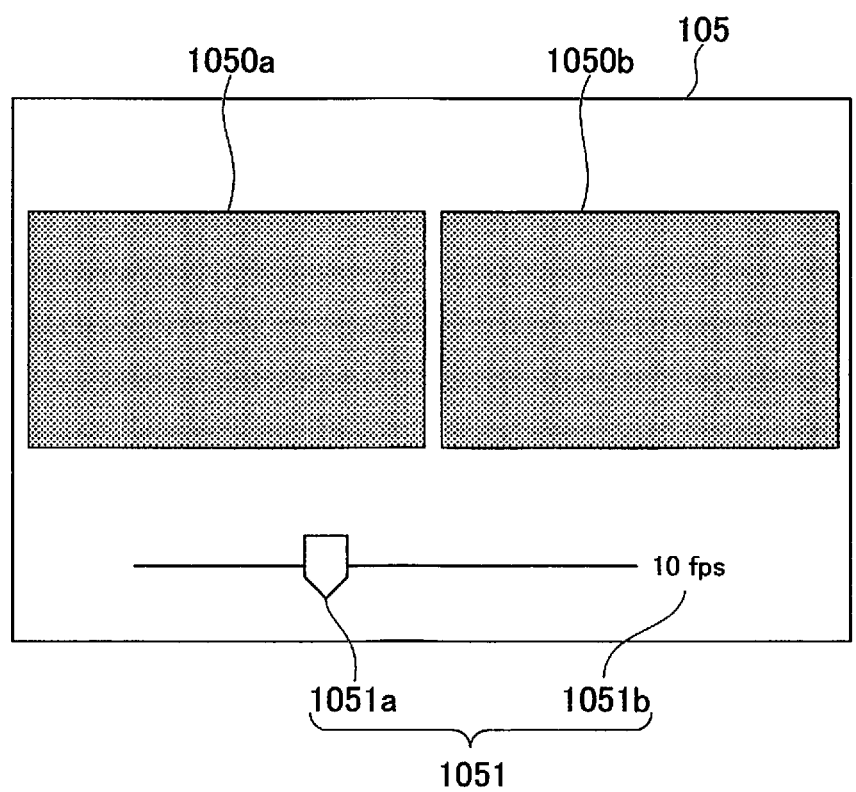
FIG. 15 is a diagram showing a screen of a display according to the third embodiment of the present invention.

FIG. 15 shows a screen of the display 105. The same parts as those shown in FIG. 12 will not be described. The display 105 displays an image 1050a and an image 1050b. The image 1050a is displayed on the basis of the image data received from the transmission terminal 21a. The image 1050b is displayed on the basis of the image data received from the transmission terminal 21b. The screen of the display 105 is not limited to the example shown in FIG. 15. In FIG. 15, the image 1050a and the image 1050b are arranged in the horizontal direction. The image 1050a and the image 1050b may be arranged in the vertical direction.

Figure 16:
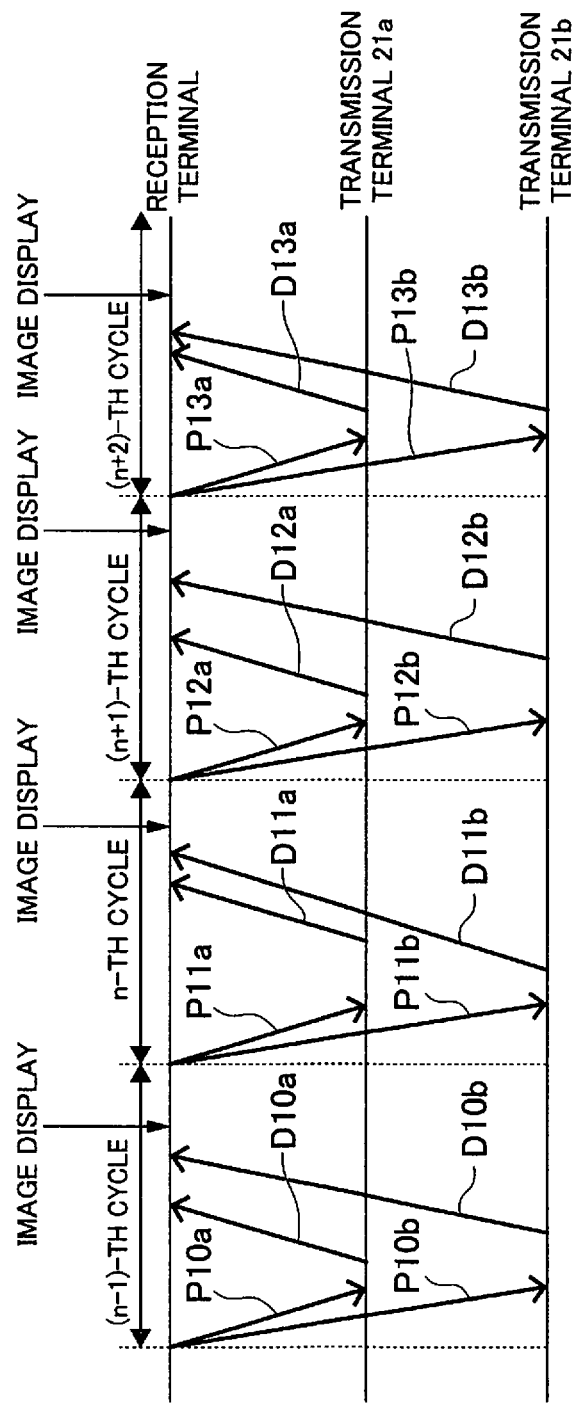
FIG. 16 is a timing chart showing communication performed by the reception terminal and a transmission terminal according to the third embodiment of the present invention.
Figure 17:
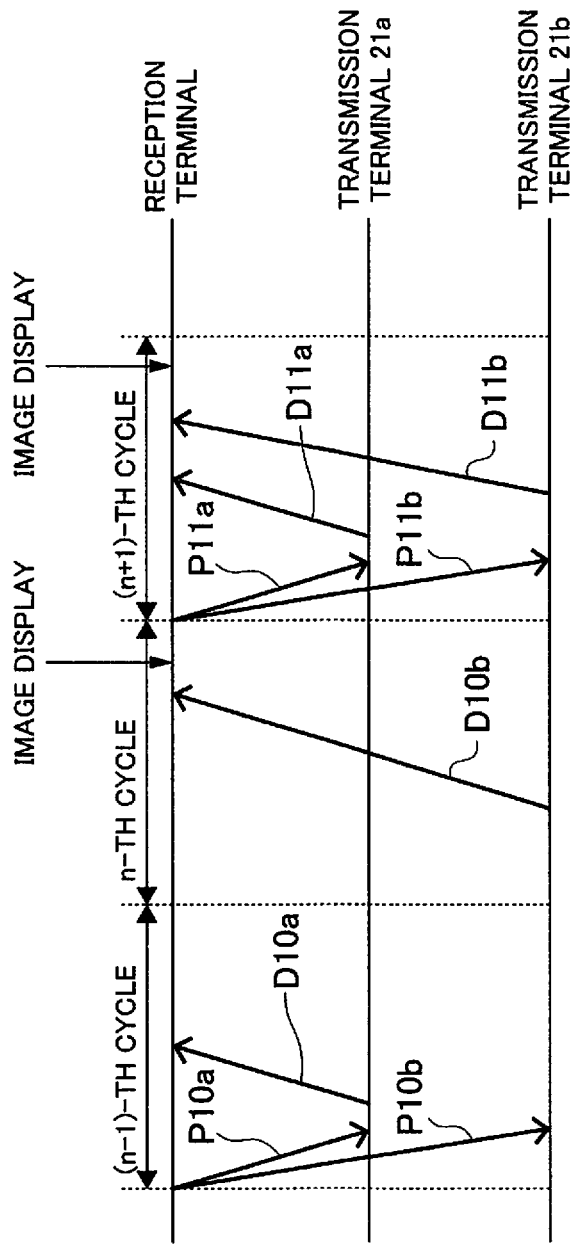
FIG. 17 is a timing chart showing communication performed by the reception terminal and the transmission terminal according to the third embodiment of the present invention.
Figure 18:
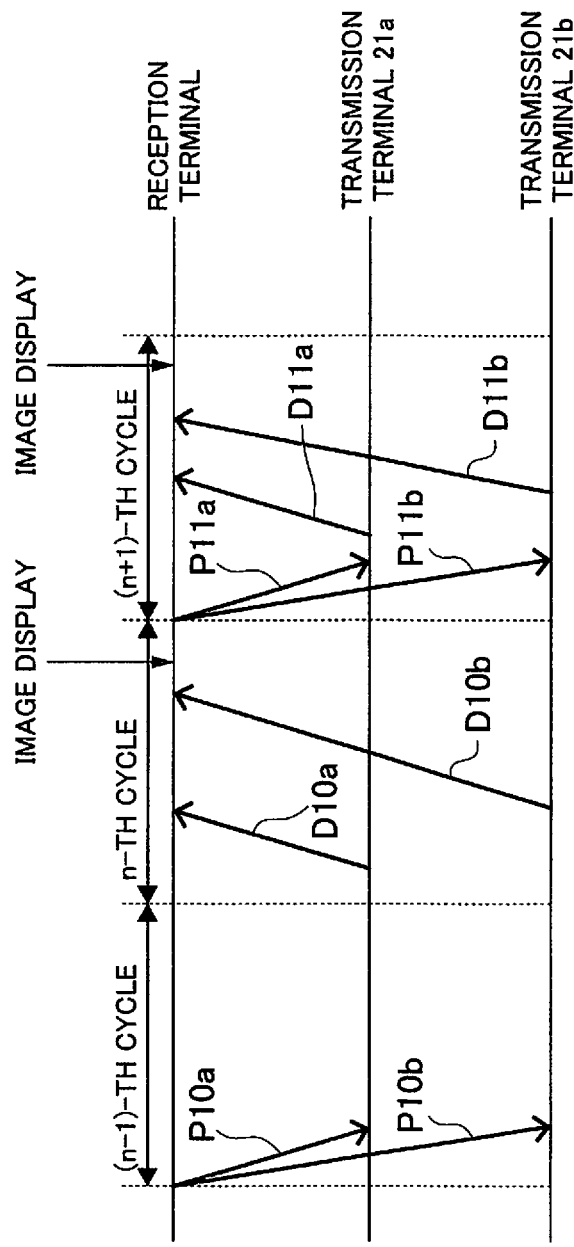
FIG. 18 is a timing chart showing communication performed by the reception terminal and the transmission terminal according to the third embodiment of the present invention.

FIGS. 16 to 18 show timings of communication of the polling request and the response data in multiple cycles in a row. The number n showing a number of each cycle is an integer. For example, the length of each cycle is 100 ms.

FIG. 16 shows communication in a case in which the response data are always received in the same cycle as that in which the polling request is transmitted. When the timing signal is output from the timer 102, the (n−1)-th cycle is started. At this time, the reception terminal 11 transmits a polling request P10a to the transmission terminal 21a and transmits a polling request P10b to the transmission terminal 21b (Step S110a).

The transmission terminal 21a receives the polling request P10a (Step S205). When transmissible response data are stored on the storage medium 202, the transmission terminal 21a transmits response data D10a to the reception terminal 11 (Step S215). Similarly, the transmission terminal 21b receives the polling request P10b and transmits response data D10b to the reception terminal 11 (Step S205 and Step S215).

In the (n−1)-th cycle, the reception terminal 11 receives the response data D10a and the response data D10b (Step S120a). In the (n−1)-th cycle, the display 105 simultaneously displays an image on the basis of the response data D10a and an image on the basis of the response data D10b (Step S141). After the response data D10a and the response data D10b are received, the control circuit 101 waits for the timing signal output from the timer 102 in the (n−1)-th cycle.

When the timing signal is output from the timer 102, the n-th cycle is started. At this time, the reception terminal 11 transmits a polling request P11a to the transmission terminal 21a and transmits a polling request P11b to the transmission terminal 21b (Step S110a).

The transmission terminal 21a receives the polling request P11a (Step S205). When transmissible response data are stored on the storage medium 202, the transmission terminal 21a transmits response data D11a to the reception terminal 11 (Step S215). Similarly, the transmission terminal 21b receives the polling request P11b and transmits response data D11b to the reception terminal 11 (Step S205 and Step S215).

In the n-th cycle, the reception terminal 11 receives the response data D11a and the response data D11b (Step S120a). In the n-th cycle, the display 105 simultaneously displays an image on the basis of the response data D11a and an image on the basis of the response data D11b (Step S141). After the response data D11a and the response data D11b are received, the control circuit 101 waits for the timing signal output from the timer 102 in the n-th cycle.

When the timing signal is output from the timer 102, the (n+1)-th cycle is started. At this time, the reception terminal 11 transmits a polling request P12a to the transmission terminal 21a and transmits a polling request P12b to the transmission terminal 21b (Step S110a). Thereafter, a similar operation to that described above is repeated. The transmission terminal 21a receives the polling request P12a and transmits response data D12a to the reception terminal 11 (Step S205 and Step S215). The transmission terminal 21b receives the polling request P12b and transmits response data D12b to the reception terminal 11 (Step S205 and Step S215).

In the (n+1)-th cycle, the reception terminal 11 receives the response data D12a and the response data D12b (Step S120a). In the (n+1)-th cycle, the display 105 simultaneously displays an image on the basis of the response data D12a and an image on the basis of the response data D12b (Step S141).

When the (n+2)-th cycle is started, the reception terminal 11 transmits a polling request P13a to the transmission terminal 21a and transmits a polling request P13b to the transmission terminal 21b (Step S110a). The transmission terminal 21a receives the polling request P13a and transmits response data D13a to the reception terminal 11 (Step S205 and Step S215). The transmission terminal 21b receives the polling request P13b and transmits response data D13b to the reception terminal 11 (Step S205 and Step S215).

In the (n+2)-th cycle, the reception terminal 11 receives the response data D13a and the response data D13b (Step S120a). In the (n+2)-th cycle, the display 105 simultaneously displays an image on the basis of the response data D13a and an image on the basis of the response data D13b (Step S141).

Even if the response data are received from the transmission terminal 21a and the transmission terminal 21b in the same cycle as that (transmission cycle) in which the polling request is transmitted, the reception terminal 11 does not immediately transmit a next polling request. The reception terminal 11 stops transmission of the polling request in the transmission cycle. In the next cycle to the cycle in which the response data are received from the transmission terminal 21a and the transmission terminal 21b, the reception terminal 11 transmits the polling request to the transmission terminal 21a and the transmission terminal 21b.

In the example shown in FIG. 16, in each cycle, the response data are received from the transmission terminal 21b after the response data are received from the transmission terminal 21a. The response data do not need to be received in accordance with the order in which the polling request is transmitted. In addition, in a case in which the reception terminal 11 includes a communicator that performs communication with the transmission terminal 21a and includes a communicator that performs communication with the transmission terminal 21b, the reception terminal 11 is able to not only simultaneously transmit the polling requests but also simultaneously receive pieces of response data. The control circuit 101 causes the communicator 100 to transmit the polling requests to the transmission terminal 21a and the transmission terminal 21b at a transmission timing in a cycle following the cycle in which the response data are received from the transmission terminal 21b. The transmission timing is a timing at which an interval in accordance with a frame rate elapses from a timing at which the polling requests are transmitted to the transmission terminal 21a and the transmission terminal 21b.

FIG. 17 shows communication in a case in which the response data are not received from one of the transmission terminals in the same cycle as that in which the polling request is transmitted. When the timing signal is output from the timer 102, the (n−1)-th cycle is started. At this time, the reception terminal 11 transmits a polling request P10a to the transmission terminal 21a and transmits a polling request P10b to the transmission terminal 21b (Step S110a).

The transmission terminal 21a receives the polling request P10a (Step S205). When transmissible response data are stored on the storage medium 202, the transmission terminal 21a transmits response data D10a to the reception terminal 11 (Step S215). The transmission terminal 21b receives the polling request P10b (Step S205). The control circuit 201 of the transmission terminal 21b waits for transmissible response data to be stored on the storage medium 202 (Step S210). The processing circuit 203 of the transmission terminal 21b is unable to complete the processing of the response data in the (n−1)-th cycle.

In the (n−1)-th cycle, the reception terminal 11 receives the response data D10a (Step S120a). In the (n−1)-th cycle, the control circuit 101 waits for reception of the response data since the response data are not received from the transmission terminal 21b (Step S120a). The timing signal is output from the timer 102 and the n-th cycle is started while the control circuit 101 waits for reception of the response data. In the n-th cycle, the control circuit 101 continues to wait for reception of the response data transmitted from the transmission terminal 21b (Step S120a).

In the n-th cycle, when transmissible response data are stored on the storage medium 202, the transmission terminal 21b transmits response data D10b to the reception terminal 11 (Step S215). In the n-th cycle, the reception terminal 11 receives the response data D10b (Step S120a). In the n-th cycle, the display 105 simultaneously displays an image on the basis of the response data D10a and an image on the basis of the response data D10b (Step S141). After the response data D10b are received, the control circuit 101 waits for the timing signal output from the timer 102 in the n-th cycle.

When the timing signal is output from the timer 102, the (n+1)-th cycle is started. At this time, the reception terminal 11 transmits a polling request P11a to the transmission terminal 21a and transmits a polling request P11b to the transmission terminal 21b (Step S110a). The transmission terminal 21a receives the polling request P11a and transmits response data D11a to the reception terminal 11 (Step S205 and Step S215). The transmission terminal 21b receives the polling request P11b and transmits response data D11b to the reception terminal 11 (Step S205 and Step S215).

In the (n+1)-th cycle, the reception terminal 11 receives the response data D11a and the response data D11b (Step S120a). In the (n+1)-th cycle, the display 105 simultaneously displays an image on the basis of the response data D11a and an image on the basis of the response data D11b (Step S141).

In the (n−1)-th cycle in which the polling request P10a and the polling request P10b are transmitted, the reception terminal 11 receives the response data D10a from the transmission terminal 21a. In the n-th cycle next to the (n−1)-th cycle, the reception terminal 11 receives the response data D10b from the transmission terminal 21b. In the (n+1)-th cycle next to the n-th cycle in which the last response data D10b are received, the reception terminal 11 transmits the polling request P11a to the transmission terminal 21a and transmits the polling request P11b to the transmission terminal 21b.

FIG. 18 shows communication in a case in which the response data are not received from the two transmission terminals in the same cycle as that in which the polling request is transmitted. The processing time of certain response data in the transmission terminal 21a is different between FIG. 17 and FIG. 18. When the timing signal is output from the timer 102, the (n−1)-th cycle is started. At this time, the reception terminal 11 transmits a polling request P10a to the transmission terminal 21a and transmits a polling request P10b to the transmission terminal 21b (Step S110a).

The transmission terminal 21a receives the polling request P10a (Step S205). The control circuit 201 of the transmission terminal 21a waits for transmissible response data to be stored on the storage medium 202 (Step S210). The processing circuit 203 of the transmission terminal 21a is unable to complete the processing of the response data in the (n−1)-th cycle. The transmission terminal 21b receives the polling request P10b (Step S205). The control circuit 201 of the transmission terminal 21b waits for transmissible response data to be stored on the storage medium 202 (Step S210). The processing circuit 203 of the transmission terminal 21b is unable to complete the processing of the response data in the (n−1)-th cycle.

In the (n−1)-th cycle, the control circuit 101 waits for reception of the response data since the response data are not received from the transmission terminal 21a and the transmission terminal 21b (Step S120a). The timing signal is output from the timer 102 and the n-th cycle is started while the control circuit 101 waits for reception of the response data. In the n-th cycle, the control circuit 101 continues to wait for reception of the response data transmitted from the transmission terminal 21a and the transmission terminal 21b (Step S120a).

In the n-th cycle, when transmissible response data are stored on the storage medium 202, the transmission terminal 21a transmits response data D10a to the reception terminal 11 (Step S215). In the n-th cycle, when transmissible response data are stored on the storage medium 202, the transmission terminal 21b transmits response data D10b to the reception terminal 11 (Step S215). In the n-th cycle, the reception terminal 11 receives the response data D10a and the response data D10b (Step S120a). In the n-th cycle, the display 105 simultaneously displays an image on the basis of the response data D10a and an image on the basis of the response data D10b (Step S141). After the response data D10b are received, the control circuit 101 waits for the timing signal output from the timer 102 in the n-th cycle.

When the timing signal is output from the timer 102, the (n+1)-th cycle is started. Communication in the (n+1)-th cycle is the same as that in the (n+1)-th cycle shown in FIG. 17.

In the third embodiment, in a case in which the image data are received from all the two or more transmission terminals in the same cycle as that in which the polling request is transmitted, the reception terminal 11 can periodically acquire the image data and can periodically display the image. For example, a user can simultaneously confirm two images displayed on the basis of two optical images formed by two optical systems having parallax therebetween. Alternatively, a user can simultaneously confirm two images acquired by simultaneously imaging a subject from two viewpoints.

Modified Example of Third Embodiment

The control circuit 101 determines the communication environment between the reception terminal 11 and the transmission terminal 21a. In addition, the control circuit 101 determines the communication environment between the reception terminal 11 and the transmission terminal 21b. When the control circuit 101 determines that the communication environment has deteriorated, the control circuit 101 makes the cycle in which the polling request is transmitted longer than the cycle set before the communication environment deteriorates.

The control circuit 201 of the transmission terminal 21a determines the communication environment between the reception terminal 11 and the transmission terminal 21a. The processing circuit 203 (data-compression circuit) compresses image data. The communicator 200 transmits the compressed image data to the reception terminal 11 on the basis of the polling request. When the control circuit 201 determines that the communication environment has deteriorated, the control circuit 201 makes a compression rate of the image data higher than the compression rate set before the communication environment deteriorates. The transmission terminal 21b executes similar processing to that executed by the transmission terminal 21a.

Figure 19:
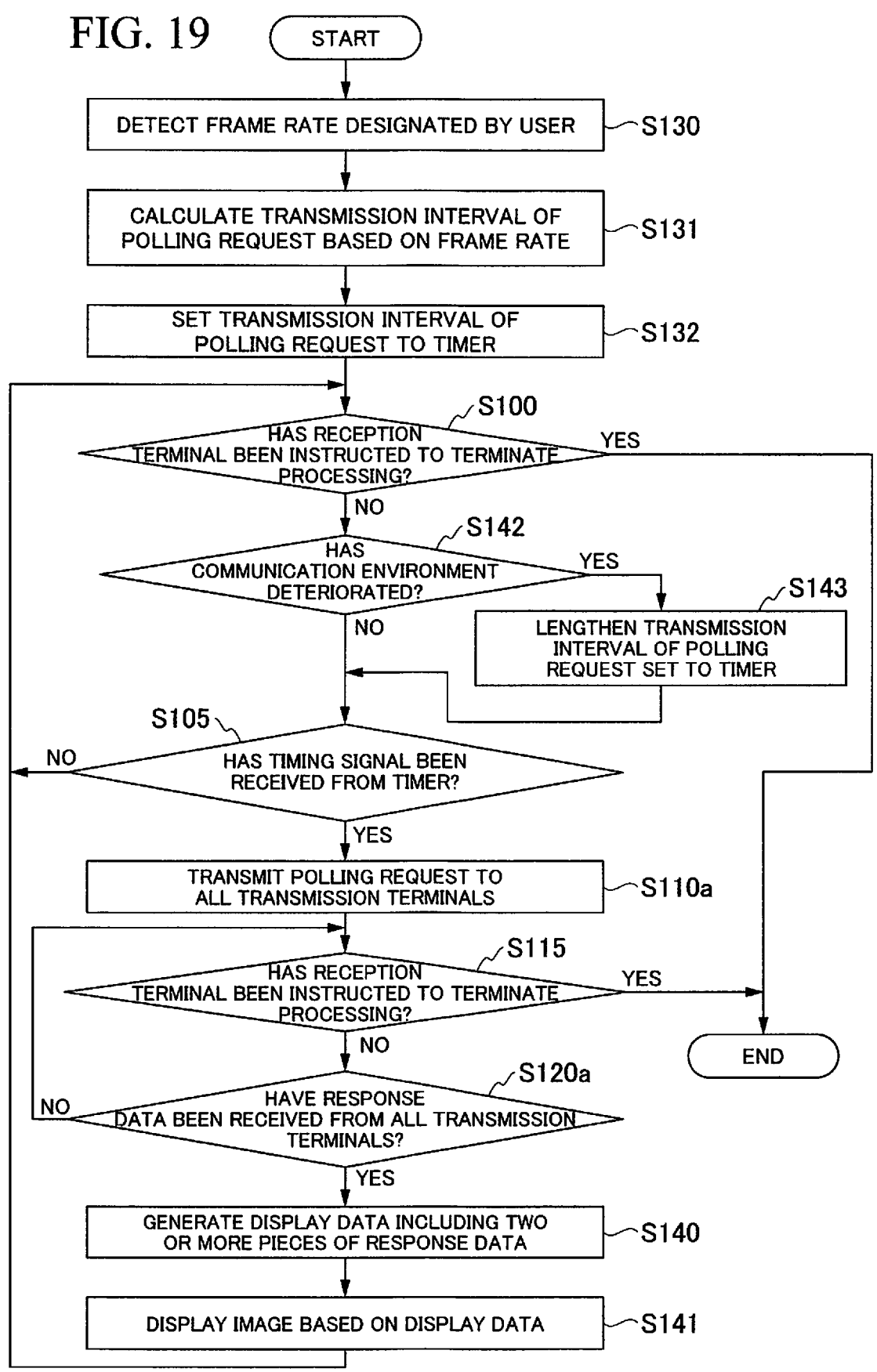
FIG. 19 is a flow chart showing a procedure of processing executed by a reception terminal according to a modified example of the third embodiment of the present invention.

The reception terminal 11 executes processing shown in FIG. 19 instead of the processing shown in FIG. 14. FIG. 19 shows a procedure of the processing executed by the reception terminal 11. An operation of the reception terminal 11 will be described with reference to FIG. 19. The same processing as that shown in FIG. 14 will not be described.

The control circuit 201 of each of the transmission terminal 21a and the transmission terminal 21b divides the response data into a plurality of data and generates a packet including each piece of data. The control circuit 201 causes the communicator 200 to sequentially transmit a plurality of packets to the reception terminal 11. The control circuit 101 of the reception terminal 11 causes the communicator 100 to sequentially receive the plurality of packets from the transmission terminal 21a or the transmission terminal 21b.

When the control circuit 101 determines that the reception terminal 11 has not been instructed to terminate processing in Step S100, the control circuit 101 determines the communication environment on the basis of the status of receiving the response data (Step S142). For example, the control circuit 101 determines the communication environment on the basis of a packet-loss rate in Step S142. When the packet-loss rate is less than or equal to a predetermined value, the control circuit 101 determines that the communication environment is good. When the packet-loss rate is greater than the predetermined value, the control circuit 101 determines that the communication environment has deteriorated. The method of determining the communication environment is not limited to the above-described method.

The control circuit 101 determines first communication environment between the reception terminal 11 and the transmission terminal 21a and determines second communication environment between the reception terminal 11 and the transmission terminal 21b in Step S142. When both the first communication environment and the second communication environment are good, the control circuit 101 determines that the communication environment is good. When at least one of the first communication environment and the second communication environment has deteriorated, the control circuit 101 determines that the communication environment has deteriorated.

When the control circuit 101 determines that the communication environment is good in Step S142, the processing in Step S105 is executed. When the control circuit 101 determines that the communication environment has deteriorated in Step S142, the control circuit 101 lengthens the transmission interval set to the timer 102 (Step S143). After Step S143, the processing in Step S105 is executed.

There is a case in which the communication environment becomes good again after the communication environment deteriorates. In that case, the control circuit 101 may shorten the transmission interval set to the timer 102 in a step not shown in FIG. 19.

When the transmission interval has been changed on the basis of the communication environment, the control circuit 101 may change the frame rate at which the display 105 displays the image. For example, when the transmission interval becomes longer, the control circuit 101 decreases the frame rate. For example, when the transmission interval becomes shorter, the control circuit 101 increases the frame rate.

Figure 20:
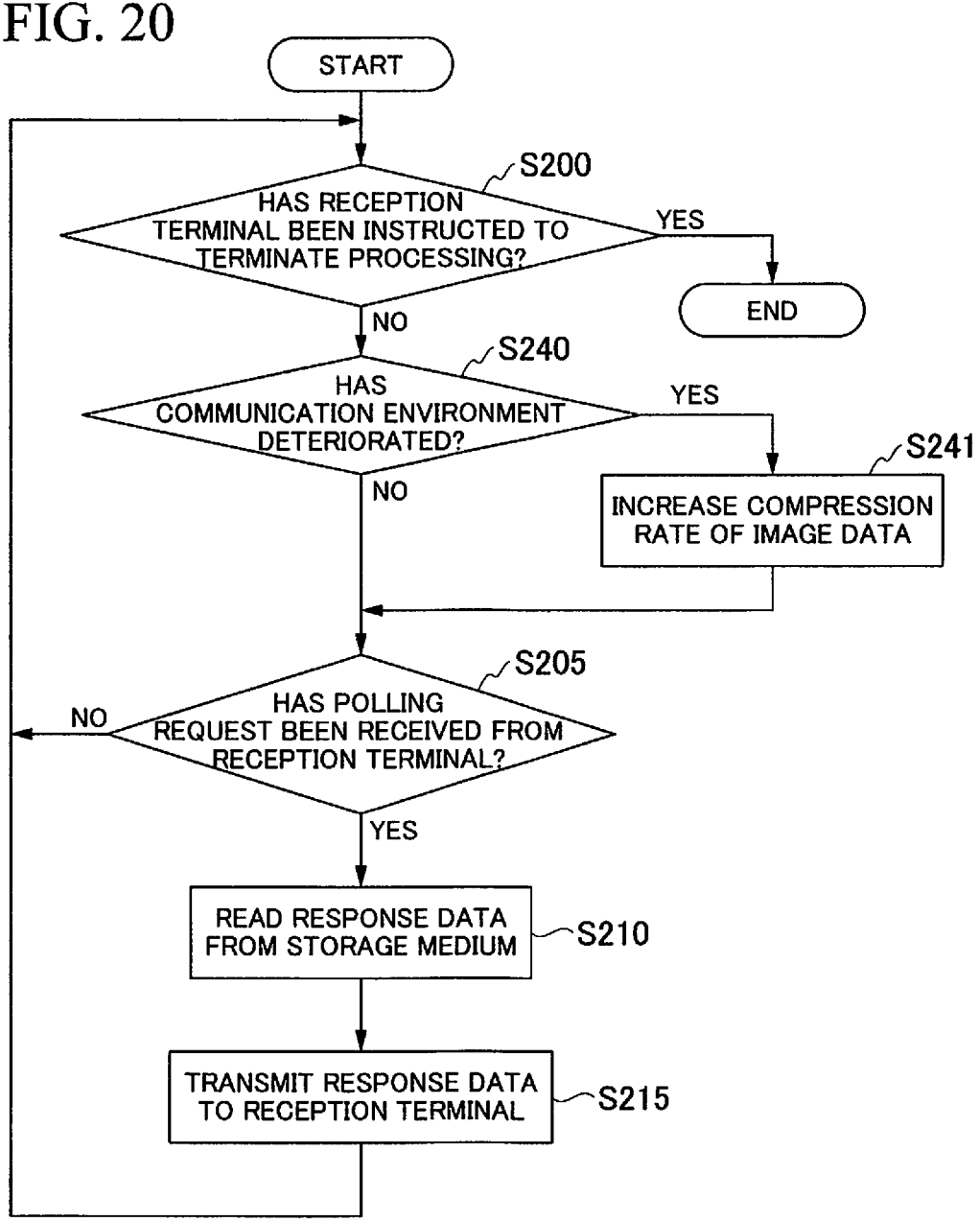
FIG. 20 is a flow chart showing a procedure of processing executed by a transmission terminal according to the modified example of the third embodiment of the present invention.

The transmission terminal 21a and the transmission terminal 21b execute processing shown in FIG. 20 instead of the processing shown in FIG. 5. FIG. 20 shows a procedure of the processing executed by the transmission terminal 21a and the transmission terminal 21b. An operation of the transmission terminal 21a and the transmission terminal 21b will be described with reference to FIG. 20. The same processing as that shown in FIG. 5 will not be described. In the description below, a transmission terminal to which a reference numeral is not given is one of the transmission terminal 21a and the transmission terminal 21b. For example, when the processing shown in FIG. 20 is started, the compression rate of image data in the processing circuit 203 of the transmission terminal is set to a predetermined value.

In a case in which a packet is not received from the transmission terminal after reception of the response data is started, the control circuit 101 of the reception terminal 11 causes the communicator 100 to transmit a retransmission request to the transmission terminal. The control circuit 201 of the transmission terminal causes the communicator 200 to receive the retransmission request from the reception terminal 11. In a case in which the retransmission request is received from the reception terminal 11, the control circuit 201 causes the communicator 200 to transmit a packet corresponding to the retransmission request to the reception terminal 11.

When the control circuit 201 determines that the transmission terminal has not been instructed to terminate processing in Step S200, the control circuit 201 determines the communication environment between the reception terminal 11 and the transmission terminal (Step S240). For example, the control circuit 201 calculates a reception interval of the retransmission request or a reception frequency of the retransmission request in Step S240. When the reception interval of the retransmission request is longer than or equal to a predetermined time or the reception frequency of the retransmission request is less than or equal to a predetermined value, the control circuit 201 determines that the communication environment is good. When the reception interval of the retransmission request is shorter than the predetermined time or the reception frequency of the retransmission request is greater than the predetermined value, the control circuit 201 determines that the communication environment has deteriorated. The method of determining the communication environment is not limited to the above-described method.

When the control circuit 201 determines that the communication environment is good in Step S240, the processing in Step S205 is executed. When the control circuit 201 determines that the communication environment has deteriorated in Step S240, the control circuit 201 increases the compression rate of the image data set to the processing circuit 203 (Step S241). After Step S241, the processing in Step S205 is executed.

There is a case in which the communication environment becomes good again after the communication environment deteriorates. In that case, the control circuit 201 may decrease the compression rate of the image data set to the processing circuit 203 in a step not shown in FIG. 20.

In the above-described example, the communication environment is determined in both the reception terminal 11 and the transmission terminal. The communication environment may be determined in only the reception terminal 11 or the transmission terminal.

In the modified example of the third embodiment, the transmission interval of the polling request becomes longer when the reception terminal 11 determines that the communication environment has deteriorated. In the modified example of the third embodiment, the compression rate of the image data increases when the transmission terminal determines that the communication environment has deteriorated. Therefore, there is a possibility that the reception terminal 11 restores periodical information acquisition.

Fourth Embodiment

Figure 21:
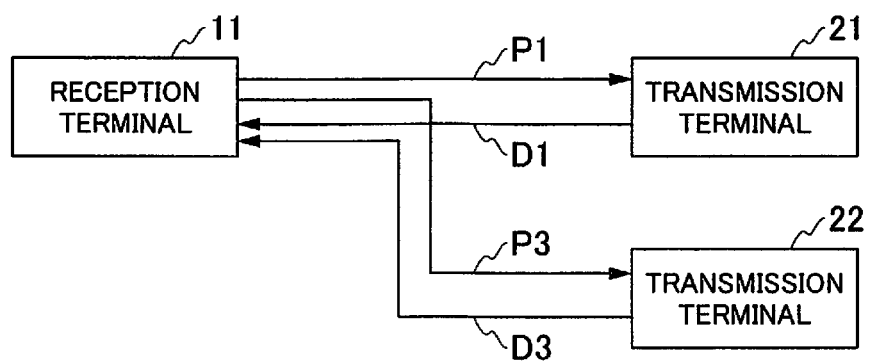
FIG. 21 is a block diagram showing a configuration of a communication system according to a fourth embodiment of the present invention.

FIG. 21 shows a configuration of a communication system 1b according to a fourth embodiment of the present invention. The communication system 1b shown in FIG. 21 includes a reception terminal 11, a transmission terminal 21, and a transmission terminal 22. The configuration of the reception terminal 11 is the same as that shown in FIG. 9. The configuration of the transmission terminal 21 is the same as that shown in FIG. 10.

The reception terminal 11 transmits a polling request P1 to the transmission terminal 21 and transmits a polling request P3 to the transmission terminal 22. The transmission terminal 21 receives the polling request P1 and transmits response data D1 to the reception terminal 11. The transmission terminal 22 receives the polling request P3 and transmits response data D3 to the reception terminal 11. The reception terminal 11 may include a communicator that performs communication with the transmission terminal 21 and may include a communicator that performs communication with the transmission terminal 22.

Figure 22:
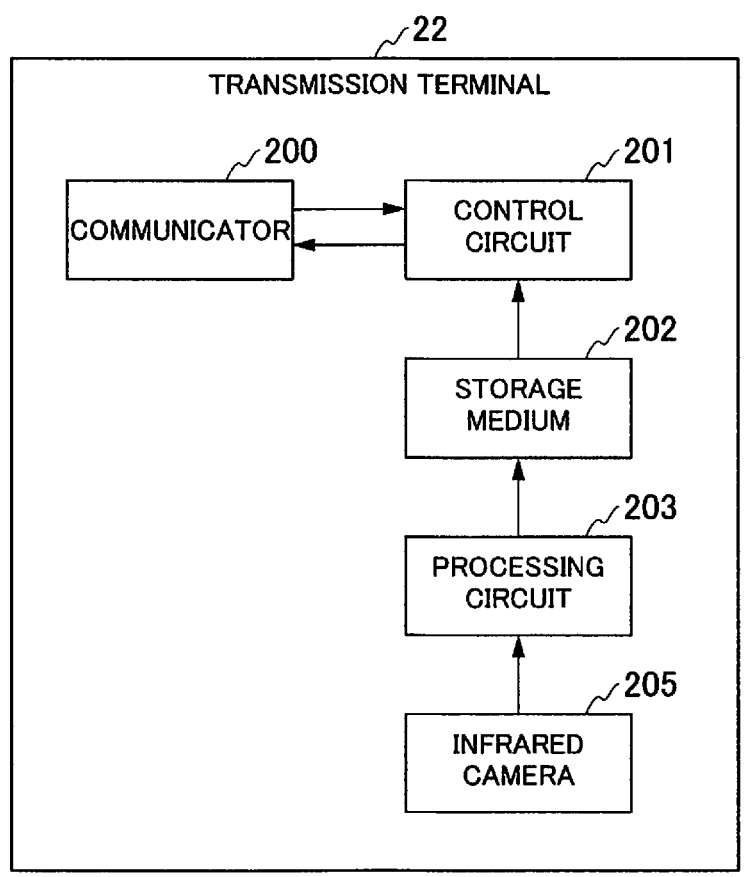
FIG. 22 is a block diagram showing a configuration of a transmission terminal according to the fourth embodiment of the present invention.

FIG. 22 shows a configuration of the transmission terminal 22 (second transmission terminal). The same configuration as that shown in FIG. 3 will not be described.

The transmission terminal 22 includes a sensor in addition to the configuration shown in FIG. 3. In the example shown in FIG. 22, the sensor is an infrared camera 205. The infrared camera 205 images a subject and generates infrared image data. The infrared camera 205 generates the infrared image data at intervals in accordance with a frame rate. The infrared camera 205 outputs the infrared image data to the processing circuit 203.

The processing circuit 203 processes the infrared image data and outputs abnormality data generated through the processing to the storage medium 202. For example, the processing circuit 203 generates temperature distribution on the basis of the infrared image data. The processing circuit 203 determines whether or not an abnormality is present on the basis of the temperature distribution and generates the abnormality data indicating the result of the determination. For example, in a case in which a large region having higher temperature than a predetermined value and having the greater area than a predetermined value is present in an infrared image, the abnormality data indicate that an abnormality is present. In a case in which the region is not present in the infrared image, the abnormality data indicate that an abnormality is not present. The processing circuit 203 may learn past temperature distribution and may distinguish between a small animal and a human. The processing circuit 203 may generate abnormality data indicating whether or not a human is present in the infrared image. The infrared camera 205 periodically generates the infrared image data at predetermined intervals and the processing circuit 203 periodically processes the infrared image data at predetermined intervals.

The storage medium 202 stores the abnormality data output from the processing circuit 203 as sensor data. The control circuit 201 reads the abnormality data from the storage medium 202 on the basis of the polling request output from the communicator 200. The control circuit 201 outputs the abnormality data to the communicator 200. The communicator 200 (third communicator) transmits the abnormality data output from the control circuit 201 to the reception terminal 11 as the response data.

The sensor included in the transmission terminal 22 is not limited to the infrared camera 205. For example, the transmission terminal 22 may include a temperature sensor that detects temperature. The transmission terminal 22 may include a position sensor that detects the position of the transmission terminal 22. For example, the position sensor is a global-positioning system (GPS) sensor.

The control circuit 101 of the reception terminal 11 causes the communicator 100 to transmit the polling requests to the transmission terminal 21 and the transmission terminal 22 in at least one of two or more consecutive cycles. In a case in which image data are received from the transmission terminal 21 in a transmission cycle and sensor data are received from the transmission terminal 22 in the transmission cycle, the control circuit 101 causes the communicator 100 to transmit the polling requests to the transmission terminal 21 and the transmission terminal 22 at a transmission timing. The transmission cycle is a cycle in which the polling requests are transmitted. The transmission timing is a timing at which an interval in accordance with a frame rate elapses from a timing at which the polling requests are transmitted. In a case in which at least one of the image data and the sensor data are not received in the transmission cycle, the control circuit 101 causes the communicator 100 to stop transmission of the polling requests in a cycle following the transmission cycle and waits for reception of at least one of the image data and the sensor data. The control circuit 101 causes the communicator 100 to transmit the polling requests to the transmission terminal 21 and the transmission terminal 22 at the transmission timing in a cycle following another cycle in which reception of the image data and the sensor data is completed. The control circuit 101 causes the display 105 to simultaneously display an image and the received sensor data at intervals in accordance with the frame rate.

In a case in which reception of the response data is not completed in a waiting period, the control circuit 101 causes the communicator 100 to transmit the polling requests to the transmission terminal 21 and the transmission terminal 22 in a cycle following the waiting period. The waiting period includes at least two consecutive cycles of the two or more cycles. In a case in which reception of the response data is not completed in two or more consecutive waiting periods, the control circuit 101 causes the communicator 100 to terminate communication with the transmission terminal 21 and communication with the transmission terminal 22. The case in which reception of the response data is not completed in the waiting period includes a case in which the response data are not received in the waiting period.

In a case in which reception of at least one of the image data and the sensor data is not completed in the waiting period, the control circuit 101 causes the communicator 100 to transmit the polling requests to the transmission terminal 21 and the transmission terminal 22 in the cycle following the waiting period. For example, in a case in which reception of the image data is not completed in all of at least two cycles included in the waiting period, the control circuit 101 causes the communicator 100 to transmit the polling requests to the transmission terminal 21 and the transmission terminal 22 in the cycle following the waiting period. Alternatively, in a case in which reception of the sensor data is not completed in all of at least two cycles included in the waiting period, the control circuit 101 causes the communicator 100 to transmit the polling requests to the transmission terminal 21 and the transmission terminal 22 in the cycle following the waiting period.

In a case in which at least one of the image data and the sensor data are not received in two or more consecutive waiting periods, the control circuit 101 causes the communicator 100 to terminate communication with the transmission terminal 21 and communication with the transmission terminal 22. For example, in a case in which the state continues twice or more in which reception of the image data is not completed in the waiting period, the control circuit 101 causes the communicator 100 to terminate communication with the transmission terminal 21 and communication with the transmission terminal 22. Alternatively, in a case in which the state continues twice or more in which reception of the sensor data is not completed in the waiting period, the control circuit 101 causes the communicator 100 to terminate communication with the transmission terminal 21 and communication with the transmission terminal 22.

The communicator 100 and the communicator 200 perform wireless communication of the polling request and the response data. The control circuit 101 determines the communication environment between the reception terminal 11 and the transmission terminal 21 and determines the communication environment between the reception terminal 11 and the transmission terminal 22. In a case in which the communicator 100 completes communication with the transmission terminal 21 and the control circuit 101 determines that the communication environment between the reception terminal 11 and the transmission terminal 21 has deteriorated, the control circuit 101 causes the communicator 100 to change communication channels used for communication with the transmission terminal 21 and resume the communication with the transmission terminal 21. In a case in which the communicator 100 completes communication with the transmission terminal 22 and the control circuit 101 determines that the communication environment between the reception terminal 11 and the transmission terminal 22 has deteriorated, the control circuit 101 causes the communicator 100 to change communication channels used for communication with the transmission terminal 22 and resume the communication with the transmission terminal 22.

The communication channel (communication frequency) used for communication between the reception terminal 11 and the transmission terminal 21 may be different from or same as the communication channel (communication frequency) used for communication between the reception terminal 11 and the transmission terminal 22. When the communicator 100 completes communication with the transmission terminal 21 and the control circuit 101 determines that the communication environment between the reception terminal 11 and the transmission terminal 21 has deteriorated, the control circuit 101 causes the communicator 100 to change communication frequencies used for communication with the transmission terminal 21 and resume the communication with the transmission terminal 21. When the communicator 100 completes communication with the transmission terminal 22 and the control circuit 101 determines that the communication environment between the reception terminal 11 and the transmission terminal 22 has deteriorated, the control circuit 101 causes the communicator 100 to change communication frequencies used for communication with the transmission terminal 22 and resume the communication with the transmission terminal 22.

For example, when the control circuit 101 determines that the communication environment between the reception terminal 11 and the transmission terminal 21 has deteriorated, the control circuit 101 determines a communication channel different from the one that is being used for communication with the transmission terminal 21 as a new communication channel. The control circuit 101 causes the communicator 100 to transmit channel information indicating the new communication channel to the transmission terminal 21. After the channel information is transmitted, the control circuit 101 causes the communicator 100 to terminate communication with the transmission terminal 21 and causes the communicator 100 to resume the communication with the transmission terminal 21 by using the new communication channel. Regarding the communication with the transmission terminal 22, the control circuit 101 executes similar processing to that described above.

In a case in which the channel information is received from the reception terminal 11 in the transmission terminal 21 and the transmission terminal 22, the control circuit 201 causes the communicator 200 to terminate communication with the reception terminal 11 and causes the communicator 200 to resume the communication with the reception terminal 11 by using the new communication channel indicated by the channel information.

Before the communicator 100 terminates communication with the transmission terminal 21 and the transmission terminal 22, the control circuit 101 may cause the communicator 100 to transmit a request to change communication channels to the transmission terminal 21. In a case in which the request to change communication channels is transmitted and the channel information is received from the transmission terminal 21, the control circuit 101 causes the communicator 100 to terminate communication with the transmission terminal 21 and causes the communicator 100 to resume the communication with the transmission terminal 21 by using the new communication channel indicated by the channel information. Regarding the communication with the transmission terminal 22, the control circuit 101 executes similar processing to that described above.

In a case in which the request to change communication channels is received from the reception terminal 11 in the transmission terminal 21 and the transmission terminal 22, the control circuit 201 determines a communication channel different from that used for communication with the reception terminal 11 as a new communication channel. The control circuit 201 causes the communicator 200 to transmit channel information indicating the new communication channel to the reception terminal 11. After the channel information is transmitted, the control circuit 201 causes the communicator 200 to terminate communication with the reception terminal 11 and causes the communicator 200 to resume the communication with the reception terminal 11 by using the new communication channel.

The control circuit 201 may cause the communicator 200 to transmit completion information indicating that the change of the channel has been completed to the reception terminal 11 without transmitting the channel information indicating the new communication channel to the reception terminal 11. The reception terminal 11 stores a network identifier of the transmission terminal 21 or the transmission terminal 22. The reception terminal 11 searches for a transmission terminal having the stored network identifier while changing communication channels and resumes communication with the transmission terminal. The network identifier includes a service set ID (SSID) or a basic service set ID (BSSID) of Wi-Fi standards.

Figure 23:
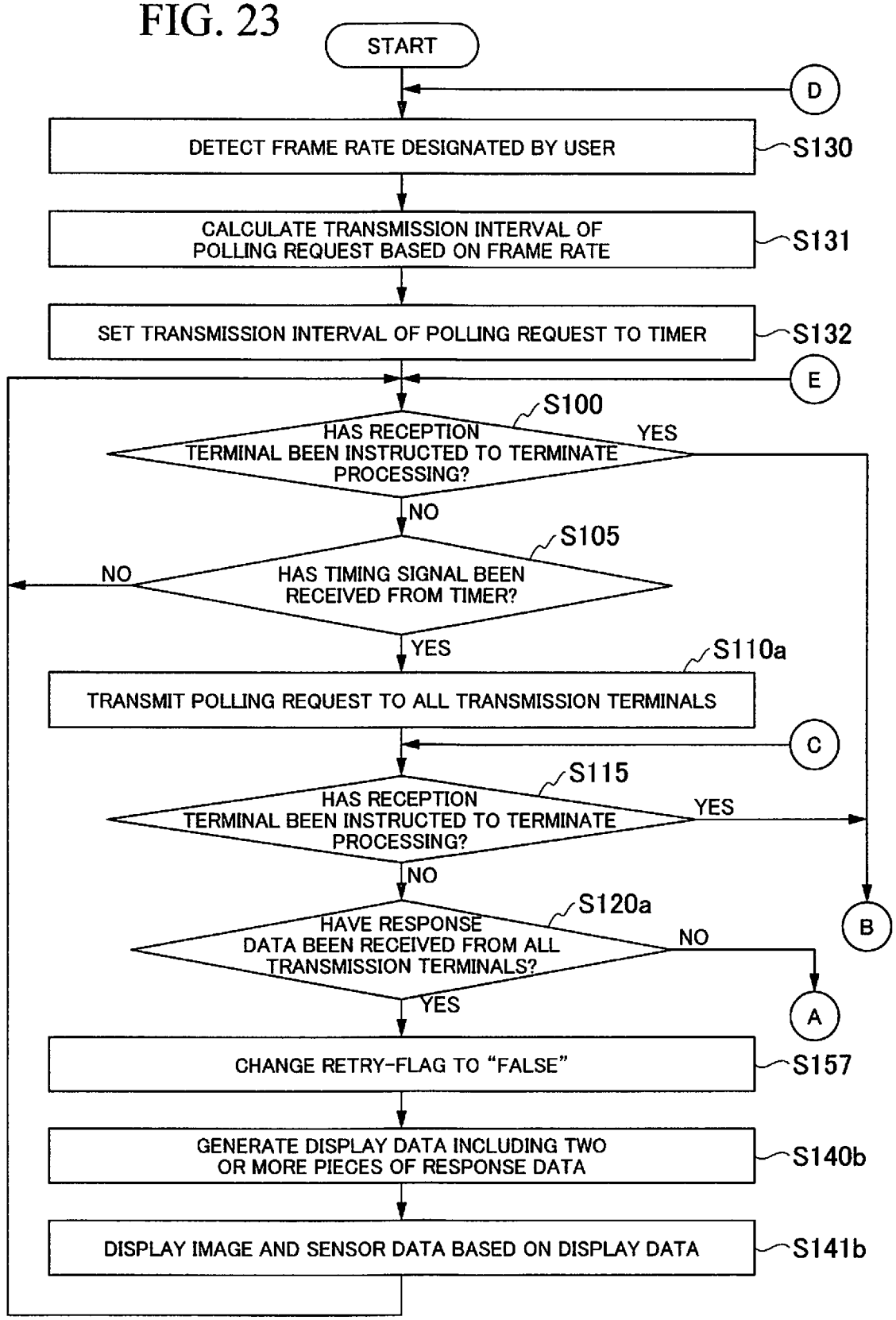
FIG. 23 is a flow chart showing a procedure of processing executed by a reception terminal according to the fourth embodiment of the present invention.
Figure 24:
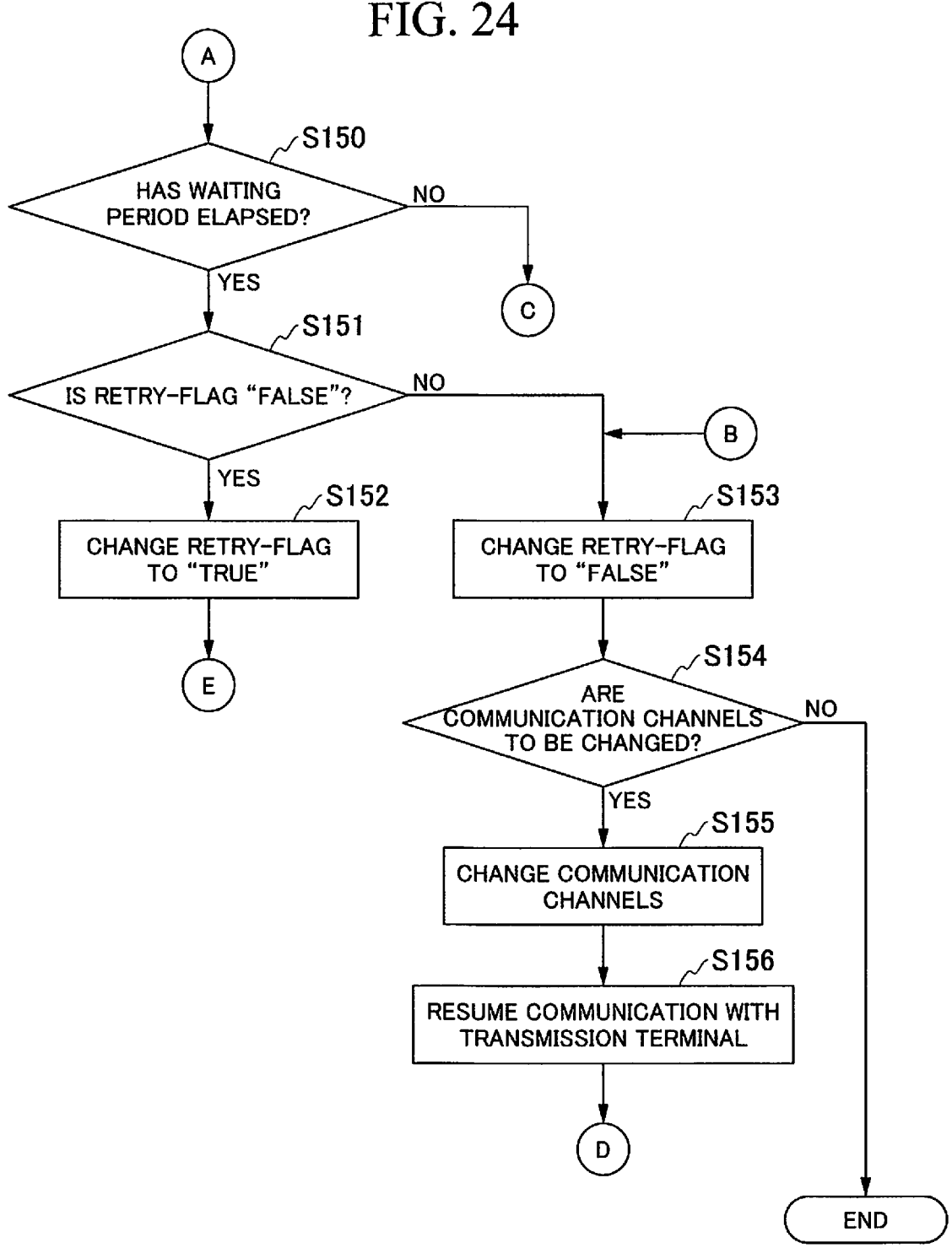
FIG. 24 is a flow chart showing a procedure of processing executed by the reception terminal according to the fourth embodiment of the present invention.

The reception terminal 11 executes processing shown in FIG. 23 and FIG. 24 instead of the processing shown in FIG. 14. FIG. 23 and FIG. 24 show a procedure of the processing executed by the reception terminal 11. An operation of the reception terminal 11 will be described with reference to FIG. 23 and FIG. 24. The same processing as that shown in FIG. 14 will not be described.

When the control circuit 101 determines that the reception terminal 11 has been instructed to terminate processing in Step S100 or Step S115, the processing in Step S153 is executed. Details of Step S153 will be described later.

When the control circuit 101 determines that the response data have not been received from at least one of the transmission terminal 21 and the transmission terminal 22 in Step S120a, the control circuit 101 determines whether or not the waiting period has elapsed since the timing of transmitting the polling request in Step S110a (Step S150). For example, the length of the waiting period is five cycles. When the control circuit 101 have received the timing signal from the timer 102 predetermined times, the control circuit 101 determines that the waiting period has elapsed.

When the control circuit 101 determines that the waiting period has not elapsed in Step S150, the processing in Step S115 is executed. When the control circuit 101 determines that the waiting period has elapsed in Step S150, the control circuit 101 determines whether or not a retry-flag is "FALSE" (Step S151).

The retry-flag indicates whether or not the reception terminal 11 is retrying transmission of the polling request. The initial value of the retry-flag is "FALSE." When the control circuit 101 determines that the retry-flag is "FALSE" in Step S151, the control circuit 101 changes the retry-flag to "TRUE" (Step S152). After Step S152, the processing in Step S100 is executed.

After the polling request is transmitted to the transmission terminal 21 and the transmission terminal 22, the control circuit 101 waits for reception of the response data transmitted from each of the transmission terminal 21 and the transmission terminal 22. In a case in which the waiting period has elapsed without completing reception of the response data of at least one of the transmission terminal 21 and the transmission terminal 22, the control circuit 101 retries transmission of the polling request.

When the retry-flag is "TRUE," the control circuit 101 causes the communicator 100 to transmit the polling request to the transmission terminal 21 and the transmission terminal 22 again in Step S110*a*.

When the waiting period has elapsed again, the determination in Step S151 is executed. When the control circuit 101 determines that the retry-flag is "TRUE" in Step S151, the control circuit 101 determines that reception of the response data is not completed in two consecutive waiting periods. In such a case, the control circuit 101 changes the retry-flag to "FALSE" (Step S153).

After Step S153, the control circuit 101 determines the communication environment and determines whether or not to change communication channels (Step S154). For example, the control circuit 101 determines the communication environment by executing similar processing to that in Step S142 shown in FIG. 19. When the retry-flag is "TRUE" in Step S151 and the communication environment has deteriorated in Step S154, the control circuit 101 determines that reception of the response data is not completed because of the deterioration of the communication environment.

In a case in which reception of the response data of the transmission terminal 21 has not been completed and the communication environment between the reception terminal 11 and the transmission terminal 21 has deteriorated, the control circuit 101 determines in Step S154 that communication channels for communication with the transmission terminal 21 are to be changed. In a case in which reception of the response data of the transmission terminal 22 has not been completed and the communication environment between the reception terminal 11 and the transmission terminal 22 has deteriorated, the control circuit 101 determines in Step S154 that communication channels for communication with the transmission terminal 22 are to be changed. In a case in which the cause of not completing reception of the response data is not the deterioration of the communication environment, the processing shown in FIG. 23 and FIG. 24 is completed. When the reception terminal 11 has been instructed to terminate processing in Step S100 or Step S115 and the determination in Step S154 has been executed, the processing shown in FIG. 23 and FIG. 24 is completed.

When the control circuit 101 determines in Step S154 that communication channels are to be changed, the control circuit 101 causes the communicator 100 to terminate communication with the transmission terminal 21 or the transmission terminal 22. Furthermore, the control circuit 101 causes the communicator 100 to change communication channels used for communication with the transmission terminal 21 or the transmission terminal 22 (Step S155).

After Step S155, the control circuit 101 causes the communicator 100 to connect to the transmission terminal 21 again and resume communication with the transmission terminal 21. Alternatively, the control circuit 101 causes the communicator 100 to connect to the transmission terminal 22 again and resume communication with the transmission terminal 22 (Step S156). After Step S156, the processing in Step S130 is executed.

When the control circuit 101 determines that the response data have been received from the transmission terminal 21 and the transmission terminal 22 in Step S120*a*, the control circuit 101 changes the retry-flag to "FALSE" (Step S157).

After Step S157, the control circuit 101 outputs two pieces of the response data received from the two transmission terminals to the processing circuit 103. In other words, the control circuit 101 outputs the image data and the sensor data to the processing circuit 103. The processing circuit 103 processes the two pieces of the response data and generates display data including the two pieces of the response data (Step S140*b*).

After Step S140*b*, the processing circuit 103 outputs the generated display data to the display 105. The display 105 simultaneously displays an image and the sensor data on the basis of the display data output from the processing circuit 103 (Step S141*b*). The control circuit 101 causes the display 105 to simultaneously display the image on the basis of the image data received from the transmission terminal 21 and the sensor data received from the transmission terminal 22 in Step S141*b*. After Step S141*b*, the processing in Step S100 is executed.

As long as the image data are received from the transmission terminal 21 and the sensor data are received from the transmission terminal 22 in a cycle (transmission cycle) in which the polling request is transmitted, the display 105 simultaneously displays the image and the sensor data at intervals in accordance with the frame rate. In a case in which reception of the image data or the sensor data is not completed in the transmission cycle, the control circuit 101 may cause the display 105 to display an image again on the basis of the previously received image data or display the previously received sensor data again. In a case in which reception of the image data or the sensor data is not completed in two or more consecutive cycles, the display 105 repeatedly displays an image on the basis of the same image data or repeatedly displays the same sensor data.

In a case in which reception of the response data is not completed in two consecutive waiting periods, the reception terminal 11 terminates communication with the transmission terminal 21 or the transmission terminal 22. In a case in which reception of the response data is not completed in three or more consecutive waiting periods, the reception terminal 11 may terminate communication with the transmission terminal 21 or the transmission terminal 22.

The reception terminal 11 may execute the processing shown in FIG. 14. In this case, the reception terminal 11 executes the processing in Step S140*b* instead of the processing in Step S140 and executes the processing in Step S141*b* instead of the processing in Step S141.

The reception terminal 11 may execute the processing shown in FIG. 19. In this case, the reception terminal 11 executes the processing in Step S140*b* instead of the processing in Step S140 and executes the processing in Step S141*b* instead of the processing in Step S141. The processing in Step S142 and Step S143 shown in FIG. 19 may be added to the processing shown in FIG. 23.

Figure 25:
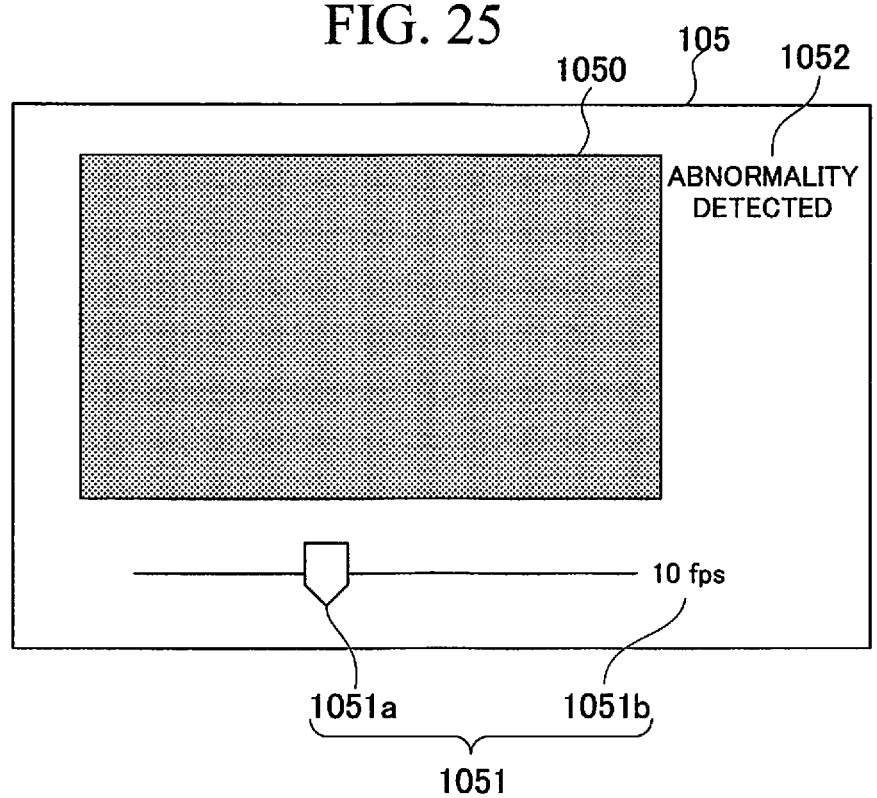
FIG. 25 is a diagram showing a screen of a display according to the fourth embodiment of the present invention.

FIG. 25 shows a screen of the display 105. The same parts as those shown in FIG. 12 will not be described. The display 105 displays sensor data 1052. The sensor data 1052 are the abnormality data. The abnormality data indicate whether or not an abnormality is present in the infrared image acquired by the infrared camera 205. The screen of the display 105 is not limited to the example shown in FIG. 25. In FIG. 25, the sensor data 1052 are displayed outside the image 1050. The sensor data 1052 may be displayed on the image 1050. In FIG. 25, the abnormality data are displayed as characters. The abnormality data may be displayed as a mark or the like.

Alternatively, processing of emphasizing a region in which the abnormality has occurred in the image 1050 or the like may be executed.

Figure 26:
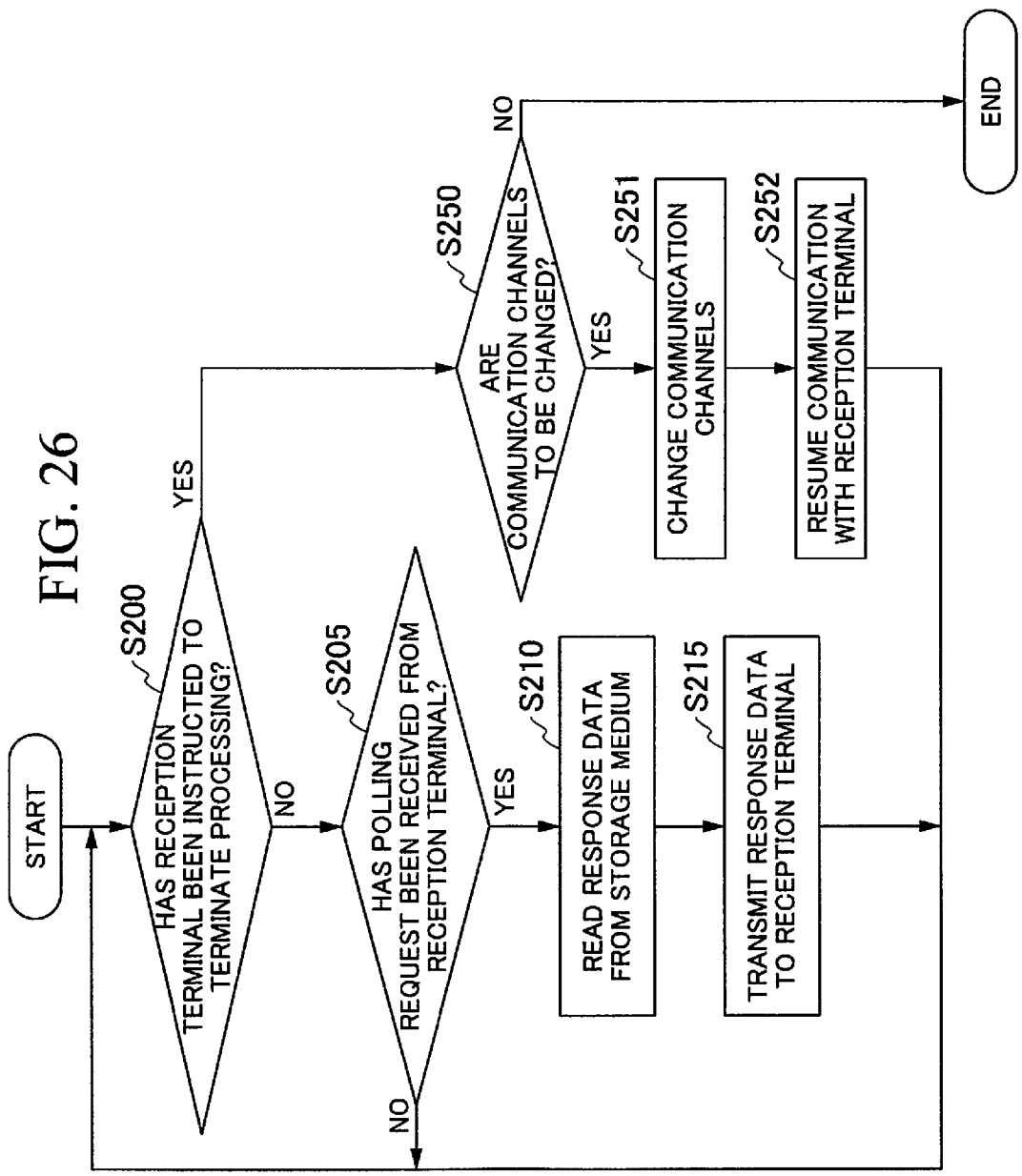
FIG. 26 is a flow chart showing a procedure of processing executed by the transmission terminal according to the fourth embodiment of the present invention.

The transmission terminal 21 and the transmission terminal 22 execute processing shown in FIG. 26 instead of the processing shown in FIG. 5. FIG. 26 shows a procedure of the processing executed by the transmission terminal 21 and the transmission terminal 22. An operation of the transmission terminal 21 and the transmission terminal 22 will be described with reference to FIG. 26. The same processing as that shown in FIG. 5 will not be described.

When the control circuit 201 determines that the transmission terminal has been instructed to terminate processing in Step S200, the control circuit 201 determines whether or not to change communication channels (Step S250). In a case in which the channel information indicating the new communication channel is received from the reception terminal 11, the control circuit 201 determines that communication channels are to be changed in Step S250. Alternatively, in a case in which the request to change communication channels is received from the reception terminal 11, the control circuit 201 determines that communication channels are to be changed in Step S250. When the transmission terminal has been instructed to terminate processing in Step S200 and the determination in Step S250 has been executed, the processing shown in FIG. 26 is completed.

When the control circuit 201 determines that communication channels are to be changed in Step S250, the control circuit 201 causes the communicator 200 to terminate communication with the reception terminal 11. Furthermore, the control circuit 201 causes the communicator 200 to change communication channels used for communication with the reception terminal 11 (Step S251).

After Step S251, the control circuit 201 causes the communicator 200 to resume communication with the reception terminal 11 (Step S252). After Step S252, the processing in Step S200 is executed.

The transmission terminal 21 and the transmission terminal 22 may execute the processing shown in FIG. 5. The transmission terminal 21 and the transmission terminal 22 may execute the processing shown in FIG. 20. The processing in Step S240 and Step S241 shown in FIG. 20 may be added to the processing shown in FIG. 26.

The communication between the reception terminal 11 and the transmission terminal 21 or the communication between the reception terminal 11 and the transmission terminal 22 may be performed through wired communication. In such a case, the processing in Steps S154 to S156 of the processing shown in FIG. 23 and FIG. 24 is not executed. In such a case, the processing in Steps S250 to S252 of the processing shown in FIG. 26 is not executed.

Figure 27:
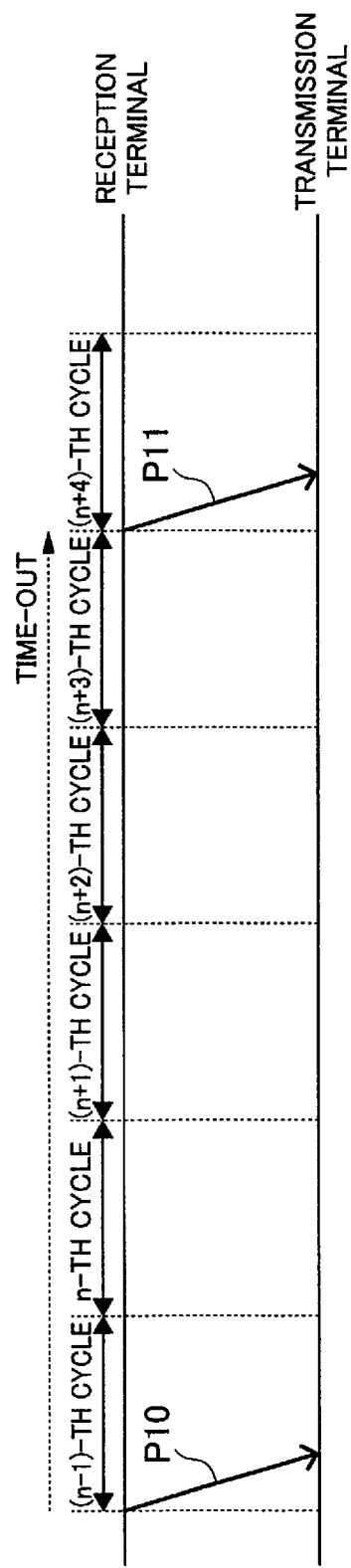
FIG. 27 is a timing chart showing communication performed by the reception terminal and the transmission terminal according to the fourth embodiment of the present invention.

FIG. 27 shows timings of communication of the polling request and the response data in multiple cycles in a row. The number n showing a number of each cycle is an integer. For example, the length of each cycle is 100 ms. Hereinafter, an example of communication between the reception terminal 11 and the transmission terminal 21 will be described.

When the timing signal is output from the timer 102, the (n−1)-th cycle is started. At this time, the reception terminal 11 transmits a polling request P10 to the transmission terminal 21 (Step S110a).

The transmission terminal 21 receives the polling request P10 (Step S205). The control circuit 201 waits until transmissible response data are stored on the storage medium 202 (Step S210). The processing circuit 203 is unable to complete the processing of the response data in the (n−1)-th cycle.

In the (n−1)-th cycle, the control circuit 101 waits for reception of the response data (Step S120a). The timing signal is output from the timer 102 and the n-th cycle is started while the control circuit 101 waits for reception of the response data. In the n-th cycle, the control circuit 101 continues to wait for reception of the response data (Step S120a).

The response data are not received from the (n−1)-th cycle to the (n+3)-th cycle. The response data are not received in five cycles including the (n−1)-th cycle in which the polling request is transmitted (Step S150). Therefore, the processing of waiting for reception of the response data on the basis of the polling request P10 comes into time-out. At this time, the retry-flag is changed to "TRUE" (Step S152). In the (n+4)-th cycle, the reception terminal 11 transmits a polling request P11 to the transmission terminal 21 (Step S110a). In a case in which the response data are not received from the (n+4)-th cycle to the (n+8)-th cycle, the reception terminal 11 terminates communication with the transmission terminal 21 (Step S155).

In the fourth embodiment, in a case in which the response data are received from all the two or more transmission terminals in the same cycle as that in which the polling request is transmitted, the reception terminal 11 can periodically acquire the image data and the sensor data and can periodically display the image and the sensor data. For example, in the communication system 1b for monitoring, the reception terminal 11 simultaneously displays an image acquired from a surveillance camera and the abnormality data acquired on the basis of the infrared image. Therefore, a user can monitor a situation such as an abnormality in terms of various points.

The reception terminal 11 can easily determine whether or not to transmit the polling request again in Step S150. After the polling request is transmitted again, the reception terminal 11 can easily determine whether or not to terminate communication in Step S154. Therefore, the reception terminal 11 can restrict unnecessary transmission of the polling request. The reception terminal 11 can execute other processing without waiting for reception of the response data. The transmission terminal 21 and the transmission terminal 22 do not need to receive unnecessary polling requests. Therefore, the transmission terminal 21 and the transmission terminal 22 can reduce the processing load.

When the reception terminal 11 is unable to acquire the response data because of the wireless communication environment, the reception terminal 11 automatically switches between communication channels and resumes communication with the transmission terminal 21 or the transmission terminal 22. Therefore, the possibility that the response data are acquired can be increased.

Fifth Embodiment

A fifth embodiment of the present invention will be described by using the communication system 1 shown in FIG. 1. The control circuit 201 of the transmission terminal 20 determines whether or not the response data are to be transmitted in a predetermined interval from the timing at which the polling request is received. When the control circuit 201 determines that the response data are not to be transmitted in the predetermined interval, the control circuit 201 causes the communicator 200 to transmit instruction data to the reception terminal 10 without transmitting the response data to the reception terminal 10. The instruction data indicate termination of communication between the reception terminal 10 and the transmission terminal 20.

After the instruction data are transmitted, the control circuit 201 causes the communicator 200 to terminate communication with the reception terminal 10. In a case in which the instruction data are received from the transmission terminal 20, the control circuit 101 of the reception terminal 10 causes the communicator 100 to terminate communication with the transmission terminal 20.

Figure 28:
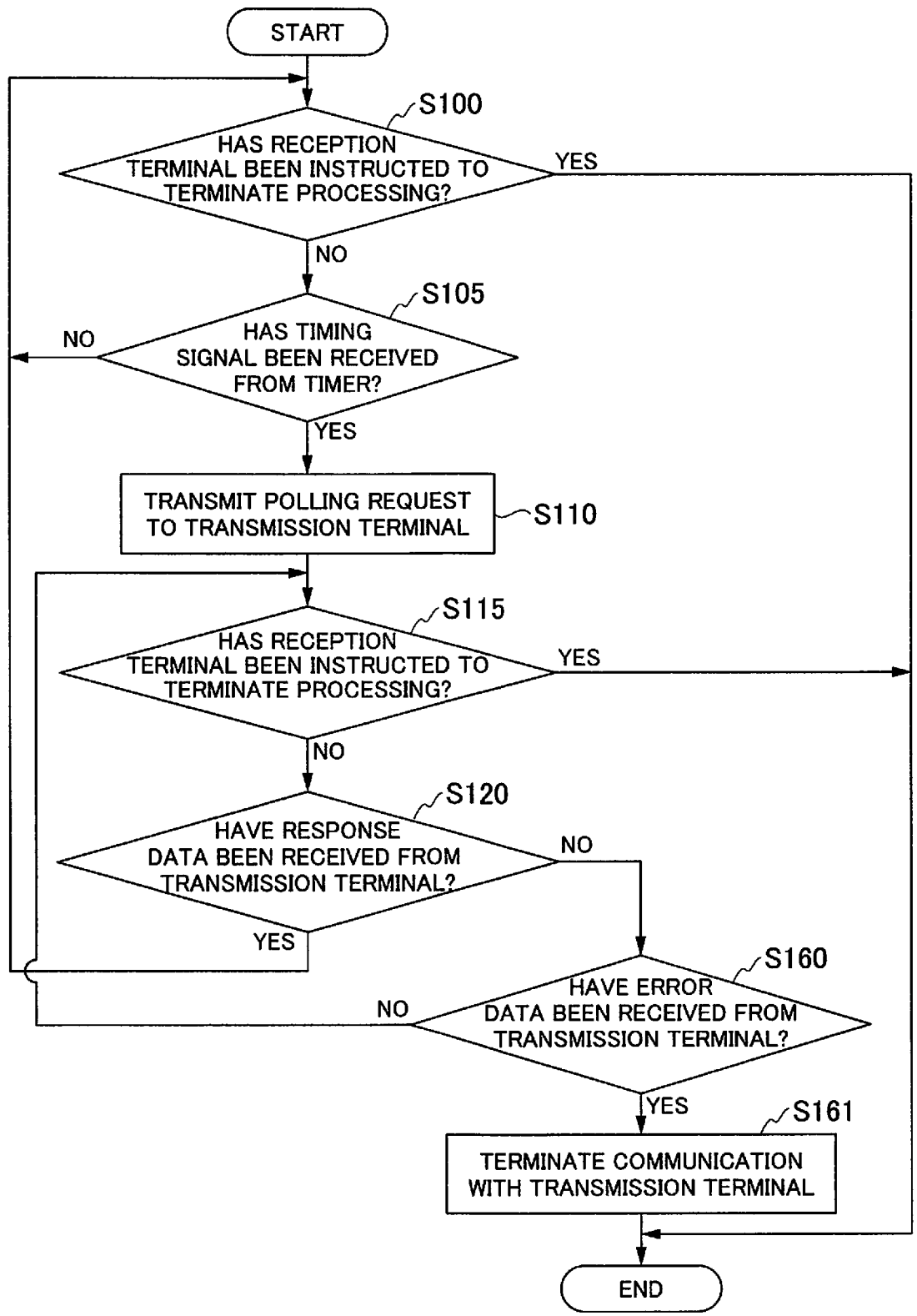
FIG. 28 is a flow chart showing a procedure of processing executed by a reception terminal according to a fifth embodiment of the present invention.

The reception terminal 10 executes processing shown in FIG. 28 instead of the processing shown in FIG. 4. FIG. 28 shows a procedure of the processing executed by the reception terminal 10. An operation of the reception terminal 10 will be described with reference to FIG. 28. The same processing as that shown in FIG. 4 will not be described.

When the control circuit 101 determines that the response data have not been received from the transmission terminal 20 in Step S120, the control circuit 101 monitors the communicator 100 and determines whether or not error data have been received from the transmission terminal 20. The error data indicate that the transmission terminal 20 is unable to transmit the response data. The error data are the instruction data indicating termination of communication. In a case in which the response data have been transmitted from the transmission terminal 20, the control circuit 101 causes the communicator 100 to receive the response data from the transmission terminal 20 (Step S160).

When the control circuit 101 determines that the error data have not been received from the transmission terminal 20 in Step S160, the processing in Step S115 is executed. When the control circuit 101 determines that the error data have been received from the transmission terminal 20 in Step S160, the control circuit 101 causes the communicator 100 to terminate communication with the transmission terminal 20 (Step S161). When the processing in Step S161 is executed, the processing shown in FIG. 28 is completed.

In the communication system 1a shown in FIG. 13, the reception terminal 11 may execute the processing shown in Step S160 and Step S161. In the communication system 1b shown in FIG. 21, the reception terminal 11 may execute the processing shown in Step S160 and Step S161.

Figure 29:
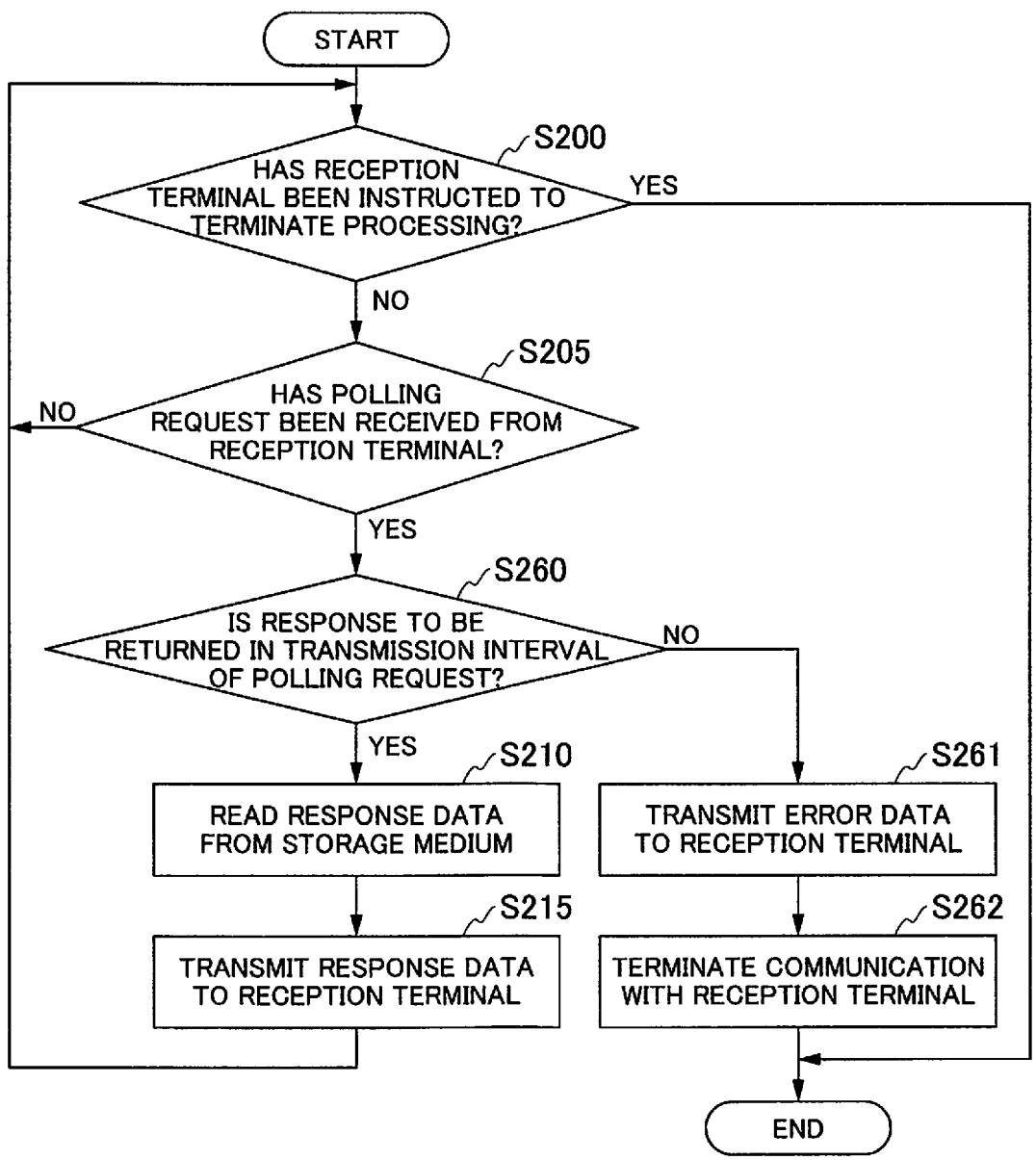
FIG. 29 is a flow chart showing a procedure of processing executed by a transmission terminal according to the fifth embodiment of the present invention.

The transmission terminal 20 executes processing shown in FIG. 29 instead of the processing shown in FIG. 5. FIG. 29 shows a procedure of the processing executed by the transmission terminal 20. An operation of the transmission terminal 20 will be described with reference to FIG. 29. The same processing as that shown in FIG. 5 will not be described.

The transmission interval of the polling request is shared by the reception terminal 10 and the transmission terminal 20. The control circuit 201 acquires the transmission interval of the polling request from the reception terminal 10 through processing not shown in FIG. 29.

When the control circuit 201 determines that the polling request has been received from the reception terminal 10 in Step S205, the control circuit 201 determines whether or not the response data are to be transmitted in the transmission interval of the polling request. For example, the control circuit 201 determines whether or not the response data are to be transmitted in the transmission interval of the polling request on the basis of a CPU use rate, the number of pieces of processing in operation, temperature information of the device, and the like (Step S260).

When the control circuit 201 determines that the response data are to be transmitted in the transmission interval of the polling request in Step S260, the processing in Step S210 is executed. When the control circuit 201 determines that the response data are not to be transmitted in the transmission interval of the polling request in Step S260, the control circuit 201 causes the communicator 200 to transmit the error data to the reception terminal 10. In this way, the communicator 200 transmits the error data to the reception terminal 10 (Step S261).

After Step S261, the control circuit 201 causes the communicator 200 to terminate communication with the reception terminal 10 (Step S262). When the processing in Step S262 is executed, the processing shown in FIG. 29 is completed.

In the communication system 1a shown in FIG. 13, the transmission terminal 21a and the transmission terminal 21b may execute the processing shown in Steps S260 to S262. In the communication system 1b shown in FIG. 21, the transmission terminal 21 and the transmission terminal 22 may execute the processing shown in Steps S260 to S262.

Figures 30, 31:
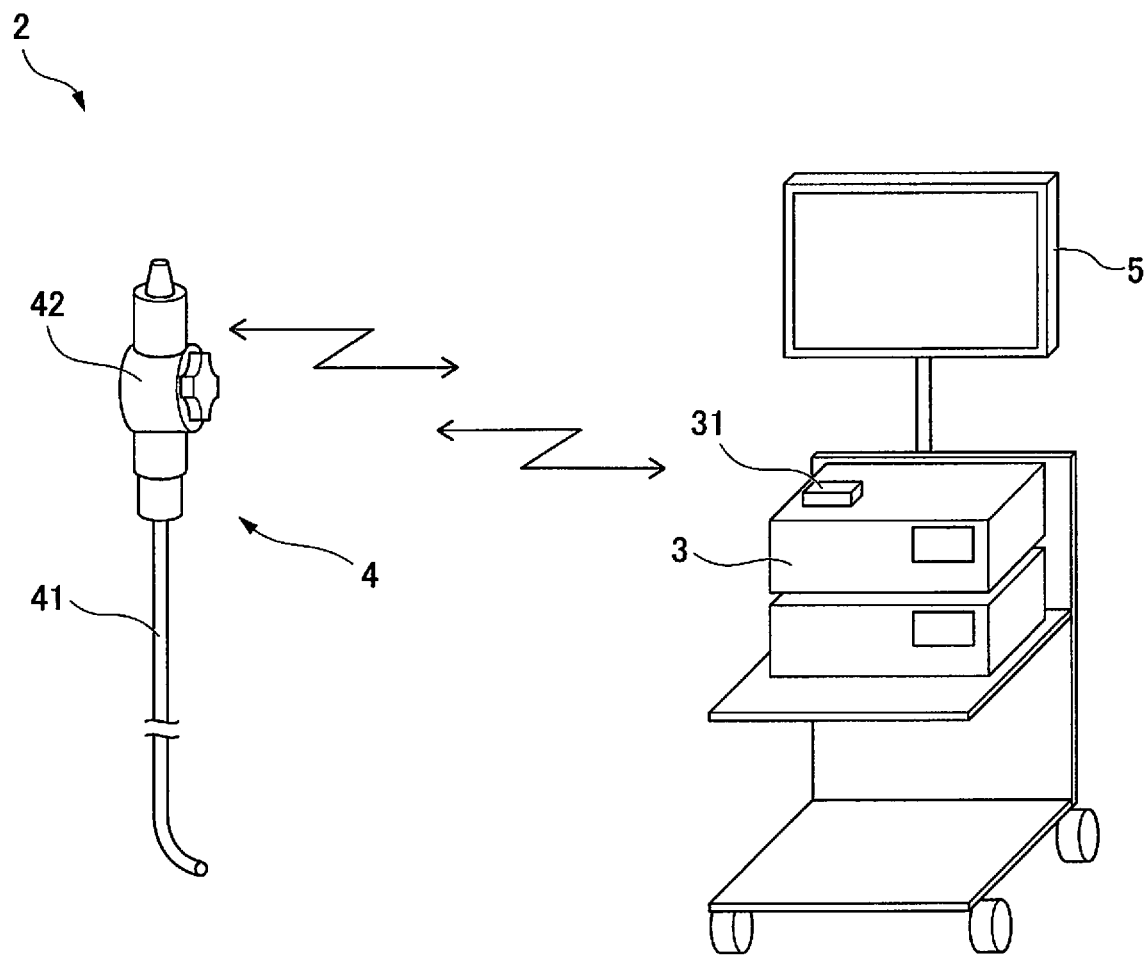
FIG. 30 is a diagram showing error data in the fifth embodiment of the present invention.
FIG. 31 is a block diagram showing a configuration of an endoscope system according to a sixth embodiment of the present invention.

FIG. 30 shows an example of the error data. The error data include an error code and an error message. The control circuit 101 of the reception terminal 10 determines whether or not the received data are the error data on the basis of the combination of the error code and the error message.

In the fifth embodiment, in a case in which it is clear that the transmission terminal 20 is unable to transmit the response data in the transmission interval of the polling request because of the processing load of the transmission terminal 20, the reception terminal 10 and the transmission terminal 20 can quickly terminate unnecessary communication. Therefore, the reception terminal 10 can restrict unnecessary transmission of the polling request. The reception terminal 10 can execute other processing without waiting for reception of the response data. The transmission terminal 20 does not need to receive unnecessary polling requests and can stop processing the response data that are not to be transmitted. Therefore, the transmission terminal 20 can reduce the processing load.

Sixth Embodiment

FIG. 31 shows a configuration of an endoscope system 2 according to a sixth embodiment of the present invention. The endoscope system 2 shown in FIG. 31 includes a processor 3, a wireless endoscope 4, and a display 5. The processor 3 is a reception terminal. The processor 3 includes a wireless receiver 31. The wireless endoscope 4 is a transmission terminal. The wireless endoscope 4 includes an insertion unit 41 and an operation unit 42. The insertion unit 41 is to be inserted into a human body and acquires an image in the human body. The insertion unit 41 includes the imaging device 204 shown in FIG. 10. The operation unit 42 wirelessly transmits the image acquired by the insertion unit 41 to the processor 3. The operation unit 42 includes the communicator 200 and the control circuit 201 shown in FIG. 10. The wireless receiver 31 receives the image transmitted by the operation unit 42. The received image is displayed on the display 5.

Only the insertion unit 41 is to be inserted into a human body. The operation unit 42 is not to be inserted into a human body. The processor 3 is arranged outside a human body. In the endoscope system 2, the processor 3 and the wireless endoscope 4 are an example of the communication system according to each aspect of the present invention. The communication system according to each aspect of the present invention may include a capsule endoscope to be inserted into a human body.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication system, comprising:
a reception terminal, including:
a first communicator configured to transmit a polling request to a first transmission terminal and receive response data from the first transmission terminal; and
a first control circuit; and
the first transmission terminal, including:
a second communicator configured to receive the polling request from the reception terminal and transmit the response data to the reception terminal on the basis of the polling request,
wherein the first control circuit is configured to cause the first communicator to transmit the polling request to the first transmission terminal at a start timing of a cycle included in two or more consecutive cycles,
the first control circuit is configured to cause the first communicator to receive the response data within a transmission cycle, the transmission cycle being a cycle in which the polling request is transmitted,
the first control circuit is configured to cause the first communicator to stop transmission of the polling request in a cycle following the transmission cycle and is configured to wait for reception of the response data in a case in which reception of the response data is not completed in the transmission cycle, and
the first control circuit is configured to cause the first communicator to transmit the polling request to the first transmission terminal at a start timing of a cycle following another cycle in which reception of the response data is completed.

2. The communication system according to claim 1,
wherein the first transmission terminal further includes an imaging device configured to image a subject and generate image data,
the response data are the image data,
the first control circuit is configured to cause a display to display an image on the basis of the received image data at intervals in accordance with a frame rate, and
the first control circuit is configured to cause the first communicator to transmit the polling request to the first transmission terminal at a transmission timing in a case in which reception of the image data is completed in the transmission cycle, the transmission timing being a timing at which the interval elapses from a timing at which the polling request is transmitted.

3. The communication system according to claim 2, comprising two or more first transmission terminals, each of which is the first transmission terminal,
wherein the first control circuit is configured to cause the first communicator to transmit the polling request to all the two or more first transmission terminals at the start timing,
the first control circuit is configured to cause the first communicator to transmit the polling request to all the two or more first transmission terminals at the transmission timing in a case in which reception of the image data of all the two or more first transmission terminals is completed in the transmission cycle,
the first control circuit is configured to cause the first communicator to stop transmission of the polling request in the cycle following the transmission cycle and is configured to wait for reception of the image data in a case in which reception of the image data of at least one of the two or more first transmission terminals is not completed in the transmission cycle, and
the first control circuit is configured to cause the first communicator to transmit the polling request to all the two or more first transmission terminals at a start timing of a cycle following another cycle in which reception of the last image data among the image data of all the two or more first transmission terminals is completed.

4. The communication system according to claim 2, comprising two or more first transmission terminals, each of which is the first transmission terminal,
wherein the first control circuit is configured to cause the display to simultaneously display two or more images at the intervals on the basis of two or more pieces of the image data received from all the two or more first transmission terminals.

5. The communication system according to claim 2, further comprising a second transmission terminal including a third communicator configured to receive the polling request from the reception terminal and transmit sensor data output from a sensor to the reception terminal as the response data,
wherein the first control circuit is configured to cause the first communicator to transmit the polling request to the first transmission terminal and the second transmission terminal at the start timing,
the first control circuit is configured to cause the first communicator to transmit the polling request to the first transmission terminal and the second transmission terminal at the transmission timing in a case in which the image data are received from the first transmission terminal in the transmission cycle and the sensor data are received from the second transmission terminal in the transmission cycle,
the first control circuit is configured to cause the first communicator to stop transmission of the polling request in the cycle following the transmission cycle and is configured to wait for reception of at least one of the image data and the sensor data in a case in which reception of at least one of the image data and the sensor data is not completed in the transmission cycle,
the first control circuit is configured to cause the first communicator to transmit the polling request to the first transmission terminal and the second transmission terminal at the transmission timing in a cycle following another cycle in which reception of the image data and the sensor data is completed, and
the first control circuit is configured to cause the display to simultaneously display the image and the received sensor data at the intervals.

6. The communication system according to claim 1,
wherein the first control circuit is configured to cause the first communicator to transmit the polling request to the first transmission terminal in a cycle following a waiting period in a case in which reception of the response data is not completed in the waiting period, the waiting period including at least two consecutive cycles of the two or more consecutive cycles, and
the first control circuit is configured to cause the first communicator to terminate communication with the first transmission terminal in a case in which reception of the response data is not completed in two or more of the consecutive waiting periods.

7. The communication system according to claim 6,
wherein each of the first communicator and the second communicator is configured to perform wireless communication of the polling request and the response data,
the first control circuit is configured to determine communication environment between the reception terminal and the first transmission terminal, and
the first control circuit is configured to cause the first communicator to change communication channels used for communication with the first transmission terminal and resume communication with the first transmission terminal in a case in which the first communicator completes communication with the first transmission terminal and the first control circuit determines that the communication environment has deteriorated.

8. The communication system according to claim 1,
wherein the first transmission terminal further includes a second control circuit,
the second control circuit is configured to determine whether or not the response data are to be transmitted in a predetermined interval from a timing at which the polling request is received, and
the second control circuit is configured to cause the second communicator to transmit instruction data to the reception terminal without transmitting the response data to the reception terminal when the second control circuit determines that the response data are not to be transmitted in the predetermined interval, the instruction data indicating termination of communication between the reception terminal and the first transmission terminal.

9. The communication system according to claim 1,
wherein the first control circuit is configured to determine communication environment between the reception terminal and the first transmission terminal, and
when the first control circuit determines that the communication environment has deteriorated, the first control circuit is configured to make each of the two or more consecutive cycles longer than each of the two or more consecutive cycles set before the communication environment deteriorates.

10. The communication system according to claim 1,
wherein the first transmission terminal further includes:
  a second control circuit configured to determine communication environment between the reception terminal and the first transmission terminal; and
  a data-compression circuit configured to compress the response data,
the second communicator is configured to transmit the compressed response data to the reception terminal on the basis of the polling request, and
when the second control circuit determines that the communication environment has deteriorated, the second control circuit is configured to make a compression rate of the response data higher than a compression rate of the response data set before the communication environment deteriorates.

11. A reception terminal, comprising:
a communicator configured to transmit a polling request to a transmission terminal and receive response data from the transmission terminal; and
a control circuit,
wherein the control circuit is configured to cause the communicator to transmit the polling request to the transmission terminal at a start timing of a cycle included in two or more consecutive cycles,
the control circuit is configured to cause the communicator to receive the response data within a transmission cycle, the transmission cycle being a cycle in which the polling request is transmitted,
the control circuit is configured to cause the communicator to stop transmission of the polling request in a cycle following the transmission cycle and is configured to wait for reception of the response data in a case in which reception of the response data is not completed in the transmission cycle, and
the control circuit is configured to cause the communicator to transmit the polling request to the transmission terminal at a start timing of a cycle following another cycle in which reception of the response data is completed.

12. A communication method, comprising:
a first step in which the control circuit causes the communicator to transmit a polling request to a transmission terminal at a start timing of a cycle included in two or more consecutive cycles;
a second step in which the control circuit causes the communicator to receive response data from the transmission terminal within a transmission cycle, the transmission cycle being a cycle in which the polling request is transmitted,
a third step in which the control circuit causes the communicator to stop transmission of the polling request in a cycle following the transmission cycle and waits for reception of the response data in a case in which reception of the response data is not completed in the transmission cycle, and
a fourth step in which the control circuit causes the communicator to transmit the polling request to the transmission terminal at a start timing of a cycle following another cycle in which reception of the response data is completed.

13. A non-transitory computer-readable recording medium saving a program for causing a computer to execute:
a first step of causing the communicator to transmit a polling request to a transmission terminal at a start timing of a cycle included in two or more consecutive cycles;
a second step of causing the communicator to receive response data from the transmission terminal within a transmission cycle, the transmission cycle being a cycle in which the polling request is transmitted,
a third step of causing the communicator to stop transmission of the polling request in a cycle following the transmission cycle and waiting for reception of the response data in a case in which reception of the response data is not completed in the transmission cycle, and
a fourth step of causing the communicator to transmit the polling request to the transmission terminal at a start timing of a cycle following another cycle in which reception of the response data is completed.

* * * * *